(12) United States Patent
Damnjanovic et al.

(10) Patent No.: US 11,497,042 B2
(45) Date of Patent: Nov. 8, 2022

(54) RESOURCE SCHEDULING TECHNIQUES IN WIRELESS SYSTEMS

(71) Applicant: QUALCOMM Incorporated, San Diego, CA (US)

(72) Inventors: Aleksandar Damnjanovic, Del Mar, CA (US); Xiaoxia Zhang, San Diego, CA (US); Junyi Li, Chester, NJ (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 16/790,588

(22) Filed: Feb. 13, 2020

(65) Prior Publication Data

US 2020/0267745 A1 Aug. 20, 2020

Related U.S. Application Data

(60) Provisional application No. 62/806,216, filed on Feb. 15, 2019.

(51) Int. Cl.
*H04W 72/12* (2009.01)
*H04L 1/18* (2006.01)
*H04W 72/04* (2009.01)

(52) U.S. Cl.
CPC ....... *H04W 72/1268* (2013.01); *H04L 1/1812* (2013.01); *H04W 72/042* (2013.01)

(58) Field of Classification Search
CPC ... H04L 1/0067; H04L 1/1812; H04L 1/1816; H04L 1/1854; H04L 1/1861;
(Continued)

(56) References Cited

U.S. PATENT DOCUMENTS 8,320,341 B2 * 11/2012 Malkamaki ........... H04L 1/1822
370/336
8,594,057 B2 * 11/2013 Huang .................. H04W 72/04
370/336
(Continued)

FOREIGN PATENT DOCUMENTS

CN 103975624 A * 8/2014 ........... H04L 1/1887
CN 103975624 B * 11/2017 ........... H04L 1/1887
(Continued)

OTHER PUBLICATIONS

International Search Report and Written Opinion—PCT/US2020/018293—ISA/EPO—Jun. 9, 2020.

*Primary Examiner* — Eric Nowlin
(74) *Attorney, Agent, or Firm* — Holland & Hart LLP

(57) ABSTRACT

Methods, systems, and devices for wireless communications are described. A User equipment (UE) may identify a set of semi-persistent scheduled resources configured for uplink transmissions by the UE. The UE may receive, from a base station, a resource grid that indicates scheduled uplink communications for one or more other UEs. The UE may determine a set of uplink resources for the UE based on the set of semi-persistent scheduled resources and the resource grid. The UE may then transmit an uplink message to the base station via the set of uplink resources. In some cases, the UE may identify resources for the scheduled uplink communications based on the resource grid and determine a set of conditional resources available for the UE based on the resources for the scheduled uplink communications, where the set of uplink resources includes at least a portion of the set of conditional resources.

30 Claims, 20 Drawing Sheets

(58) Field of Classification Search
CPC ..... H04L 1/1887; H04L 1/189; H04L 1/1893; H04W 16/10; H04W 72/04; H04W 72/042; H04W 72/1268
See application file for complete search history.

(56) References Cited

U.S. PATENT DOCUMENTS

| | | | |
|---|---|---|---|
| 10,404,418 B2* | 9/2019 | Wu | H04W 72/042 |
| 10,499,386 B2* | 12/2019 | Ying | H04L 1/16 |
| 10,813,124 B2* | 10/2020 | Cao | H04L 1/1877 |
| 10,819,475 B2* | 10/2020 | Sun | H04L 1/1861 |
| 10,841,046 B2* | 11/2020 | Yang | H04L 1/1812 |
| 10,869,333 B2* | 12/2020 | Cao | H04L 1/1893 |
| 11,019,651 B2* | 5/2021 | Karaki | H04W 72/1284 |
| 11,044,055 B2* | 6/2021 | Zou | H04L 1/1819 |
| 2004/0132405 A1* | 7/2004 | Kitazawa | H04W 52/48 |
| | | | 455/13.4 |
| 2009/0103500 A1* | 4/2009 | Malkamaki | H04L 1/1854 |
| | | | 370/336 |
| 2011/0128896 A1* | 6/2011 | Huang | H04L 1/1887 |
| | | | 370/280 |
| 2015/0195069 A1* | 7/2015 | Yi | H04W 76/27 |
| | | | 370/329 |
| 2015/0282173 A1* | 10/2015 | Wang | H04W 72/0453 |
| | | | 370/329 |
| 2016/0242176 A1* | 8/2016 | Sun | H04W 76/27 |
| 2017/0094676 A1* | 3/2017 | Kim | H04W 72/1289 |
| 2017/0373803 A1* | 12/2017 | Wu | H04L 1/1887 |
| 2018/0048432 A1* | 2/2018 | Sun | H04L 1/1819 |
| 2018/0176945 A1* | 6/2018 | Cao | H04L 5/0055 |
| 2018/0199359 A1 | 7/2018 | Cao et al. | |
| 2018/0279274 A1* | 9/2018 | Sun | H04L 1/1864 |
| 2018/0310201 A1* | 10/2018 | Lee | H04L 1/1819 |
| 2018/0331792 A1* | 11/2018 | Yang | H04W 72/04 |
| 2018/0368117 A1* | 12/2018 | Ying | H04L 1/16 |
| 2019/0090269 A1* | 3/2019 | Cao | H04L 1/16 |
| 2019/0150180 A1* | 5/2019 | Zou | H04W 72/1284 |
| | | | 370/329 |
| 2019/0245657 A1* | 8/2019 | Lee | H04L 1/1812 |
| 2019/0289618 A1* | 9/2019 | Dudda | H04L 1/1657 |
| 2020/0022174 A1* | 1/2020 | Karaki | H04W 72/0453 |
| 2020/0120707 A1* | 4/2020 | Hassan Hussein | H04W 74/02 |
| 2020/0146045 A1* | 5/2020 | Loehr | H04W 72/1242 |
| 2020/0177341 A1* | 6/2020 | Li | H04L 5/0035 |
| 2020/0266922 A1* | 8/2020 | Zhang | H04L 5/0042 |
| 2020/0266932 A1* | 8/2020 | Yang | H04L 1/1854 |
| 2021/0076409 A1* | 3/2021 | Goto | H04L 1/1864 |
| 2021/0083806 A1* | 3/2021 | Zou | H04L 1/1896 |
| 2021/0105097 A1* | 4/2021 | Hong | H04L 1/1822 |
| 2021/0235478 A1* | 7/2021 | Karaki | H04L 1/1812 |
| 2021/0345366 A1* | 11/2021 | Ying | H04L 1/0061 |

FOREIGN PATENT DOCUMENTS

| | | | | |
|---|---|---|---|---|
| CN | 109286986 A | * | 1/2019 | |
| CN | 110637432 A | * | 12/2019 | ........... H04L 1/1896 |
| CN | 107548159 B | * | 6/2020 | ........... H04W 72/04 |
| EP | 2312883 A1 | * | 4/2011 | ........... H04L 1/1887 |
| EP | 2312883 A4 | * | 1/2014 | ........... H04L 1/1887 |
| EP | 3113526 A1 | * | 1/2017 | ........... H04W 72/12 |
| EP | 3113526 A4 | * | 3/2017 | ........... H04W 72/12 |
| EP | 3273633 A2 | * | 1/2018 | ........... H04W 72/04 |
| EP | 3273633 A3 | * | 5/2018 | ......... H04W 72/042 |
| EP | 3373687 A1 | * | 9/2018 | ........ H04W 72/0413 |
| EP | 3439216 A1 | * | 2/2019 | ......... H04W 72/042 |
| EP | 3373687 A4 | * | 6/2019 | ........... H04L 5/0053 |
| EP | 3113526 B1 | * | 12/2019 | ........... H04W 72/12 |
| EP | 3625915 A1 | * | 3/2020 | ......... H04W 72/042 |
| EP | 3373687 B1 | * | 3/2021 | ........ H04W 72/0413 |
| EP | 3273633 B1 | * | 5/2021 | ........... H04L 1/1861 |
| EP | 3552426 B1 | * | 7/2021 | ............... H04L 1/16 |
| EP | 3908064 A1 | * | 11/2021 | ............... H04L 1/16 |
| JP | 5285775 B2 | * | 9/2013 | ........... H04W 72/04 |
| JP | 6496777 B2 | * | 4/2019 | ........... H04W 72/14 |
| KR | 20110039294 A | * | 4/2011 | ........... H04W 72/04 |
| KR | 101198507 B1 | * | 11/2012 | ........... H04L 1/1887 |
| MX | 2011001385 A | * | 6/2011 | ........... H04L 1/1887 |
| WO | WO-2013170464 A1 | * | 11/2013 | ........... H04L 1/1887 |
| WO | WO-2017078501 A1 | * | 5/2017 | ........... H04W 72/04 |
| WO | WO-2018174680 A1 | * | 9/2018 | ........... H04L 1/1854 |
| WO | WO-2018211364 A1 | * | 11/2018 | ........... H04W 72/14 |
| WO | WO-2019030236 A1 | | 2/2019 | |
| WO | WO-2020172764 A1 | * | 9/2020 | ........... H04W 72/121 |

* cited by examiner

RESOURCE SCHEDULING TECHNIQUES IN WIRELESS SYSTEMS

CROSS REFERENCE

The present Application for Patent claims the benefit of U.S. Provisional Patent Application No. 62/806,216 by Damnjanovic et al., entitled "RESOURCE SCHEDULING TECHNIQUES IN WIRELESS SYSTEMS," filed Feb. 15, 2019, assigned to the assignee hereof, and expressly incorporated by reference in its entirety herein.

BACKGROUND

The following relates generally to wireless communications, and more specifically to resource scheduling techniques in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In low latency communications (e.g., ultra-reliable low latency communications (URLLC)), downlink control information (DCI) may be used to provide scheduling information for a UE. In some cases, however, the DCI information may be limited in size and may therefore be unable to provide enough information to maintain a given quality of service, which may affect high reliability communications and reduce efficiency in the system. Further, radio channel conditions may change over time, and resources may be reassigned to some UEs as a result, which in resource constrained systems may lead to the reassignment of resources for many UEs.

SUMMARY

The described techniques relate to improved methods, systems, devices, and apparatuses that support resource scheduling techniques in wireless systems. Generally, the described techniques provide a base station flexibility in selecting the modulation and coding scheme (MCS) and resource assignments when scheduling communications for a user equipment (UE). A base station may configure the UE with semi-persistent resources based on a semi-persistent scheduling (SPS) configuration. The semi-persistent resources may be for uplink transmissions, downlink transmissions, or both. For downlink transmissions, the UE may perform blind decoding on the downlink semi-persistent resources. Performing blind decoding on the semi-persistent resources may support the base station to use a different value for an MCS without re-assigning resources to the UE or transmitting another grant in downlink control information. For example, the base station may use a different number of symbol periods or resource element groups and use a different MCS than the MCS originally configured upon initialization of the SPS. In some cases, the UE may perform blind-decoding to decrease downlink control information (DCI) overhead and enhance performance of decoding downlink transmissions by reducing a number of decoding errors.

For uplink transmissions, the base station may transmit an indication of a resource grid to the UE. The resource grid may indicate how resources are assigned for one or more UEs (e.g., including the receiving UE) according to the SPS configuration. The UE may identify the resource grid and determine uplink resources available for uplink transmission based on an SPS assignment for the UE and the resource grid. This may support the UE to use a different MCS for uplink transmissions than the one originally configured by the SPS configuration. In some cases, the base station may configure conditional and non-conditional SPS resources, where the use of the conditional SPS resource is based on scheduling for uplink retransmission. In some cases, the uplink retransmissions may be scheduled by a group downlink control channel transmission. Having the flexibility of using different MCSs may improve adaptability regarding the scheduling of wireless resources for multiple UEs, and resources may be more easily reassigned. Dynamic scheduling of retransmissions on uplink may improve reliability in low latency systems.

A method of wireless communications at a UE is described. The method may include identifying a set of semi-persistent scheduled resources configured for uplink transmissions by the UE, receiving, from a base station, a resource grid that indicates scheduled uplink communications for one or more other UEs, determining a set of uplink resources for the UE based on the set of semi-persistent scheduled resources and the resource grid, and transmitting an uplink message to the base station via the set of uplink resources.

An apparatus for wireless communications at a UE is described. The apparatus may include a processor, memory coupled with the processor, and instructions stored in the memory. The instructions may be executable by the processor to cause the apparatus to identify a set of semi-persistent scheduled resources configured for uplink transmissions by the UE, receive, from a base station, a resource grid that indicates scheduled uplink communications for one or more other UEs, determine a set of uplink resources for the UE based on the set of semi-persistent scheduled resources and the resource grid, and transmit an uplink message to the base station via the set of uplink resources.

Another apparatus for wireless communications at a UE is described. The apparatus may include means for identifying a set of semi-persistent scheduled resources configured for uplink transmissions by the UE, receiving, from a base station, a resource grid that indicates scheduled uplink communications for one or more other UEs, determining a set of uplink resources for the UE based on the set of semi-persistent scheduled resources and the resource grid, and transmitting an uplink message to the base station via the set of uplink resources.

A non-transitory computer-readable medium storing code for wireless communications at a UE is described. The code may include instructions executable by a processor to identify a set of semi-persistent scheduled resources configured for uplink transmissions by the UE, receive, from a base station, a resource grid that indicates scheduled uplink communications for one or more other UEs, determine a set of uplink resources for the UE based on the set of semi-persistent scheduled resources and the resource grid, and transmit an uplink message to the base station via the set of uplink resources.

Some examples of the method, apparatuses, and non-transitory computer-readable medium described herein may further include operations, features, means, or instructions for identifying resources for the scheduled uplink communications based on the resource grid, and determining the set of uplink resources based on the resources for the scheduled uplink communications, the set of uplink resources including time-frequency resources non overlapping with the set of semi-persistent scheduled resources and the resources for the scheduled uplink communications.

Some examples of the method, apparatuses, and non-transitory computer-readable medium described herein may further include operations, features, means, or instructions for identifying resources for the scheduled uplink communications based on the resource grid, and determining a set of conditional resources available for the UE based on the resources for the scheduled uplink communications, where the set of uplink resources includes at least a portion of the set of conditional resources.

In some examples of the method, apparatuses, and non-transitory computer-readable medium described herein, transmitting the uplink message may include operations, features, means, or instructions for rate-matching and scaling the uplink message across the set of uplink resources, the set of uplink resources including the set of semi-persistent scheduled resources.

In some examples of the method, apparatuses, and non-transitory computer-readable medium described herein, the set of uplink resources includes additional resources different from the set of semi-persistent scheduled resources.

In some examples of the method, apparatuses, and non-transitory computer-readable medium described herein, receiving the resource grid may include operations, features, means, or instructions for receiving a broadcast message from the base station, the broadcast message indicating the resource grid.

In some examples of the method, apparatuses, and non-transitory computer-readable medium described herein, receiving the resource grid may include operations, features, means, or instructions for receiving a group-specific control channel for a set of UEs including the UE, the group-specific control channel indicating the resource grid.

In some examples of the method, apparatuses, and non-transitory computer-readable medium described herein, the group-specific control channel includes a physical downlink control channel (PDCCH).

Some examples of the method, apparatuses, and non-transitory computer-readable medium described herein may further include operations, features, means, or instructions for identifying a set of dynamically configured retransmission resources for the UE after transmission of the uplink message, and retransmitting the uplink message via the set of dynamically configured retransmission resources for the UE.

In some examples of the method, apparatuses, and non-transitory computer-readable medium described herein, the set of dynamically configured retransmission resources may be associated with a power boost, and the uplink message may be retransmitted in accordance with the power boost.

In some examples of the method, apparatuses, and non-transitory computer-readable medium described herein, the scheduled uplink communications for the one or more other UEs may be retransmissions for the one or more other UEs scheduled via resources indicated by the resource grid.

A method of wireless communications at a base station is described. The method may include transmitting an indication of a set of semi-persistent scheduled resources for a UE, transmitting, to the UE, a resource grid that indicates scheduled uplink communications for one or more other UEs, and monitoring a set of uplink resources for an uplink message from the UE based on the resource grid, the set of uplink resources including at least a portion of the set of semi-persistent scheduled resources.

An apparatus for wireless communications at a base station is described. The apparatus may include a processor, memory coupled with the processor, and instructions stored in the memory. The instructions may be executable by the processor to cause the apparatus to transmit an indication of a set of semi-persistent scheduled resources for a UE, transmit, to the UE, a resource grid that indicates scheduled uplink communications for one or more other UEs, and monitor a set of uplink resources for an uplink message from the UE based on the resource grid, the set of uplink resources including at least a portion of the set of semi-persistent scheduled resources.

Another apparatus for wireless communications at a base station is described. The apparatus may include means for transmitting an indication of a set of semi-persistent scheduled resources for a UE, transmitting, to the UE, a resource grid that indicates scheduled uplink communications for one or more other UEs, and monitoring a set of uplink resources for an uplink message from the UE based on the resource grid, the set of uplink resources including at least a portion of the set of semi-persistent scheduled resources.

A non-transitory computer-readable medium storing code for wireless communications at a base station is described. The code may include instructions executable by a processor to transmit an indication of a set of semi-persistent scheduled resources for a UE, transmit, to the UE, a resource grid that indicates scheduled uplink communications for one or more other UEs, and monitor a set of uplink resources for an uplink message from the UE based on the resource grid, the set of uplink resources including at least a portion of the set of semi-persistent scheduled resources.

Some examples of the method, apparatuses, and non-transitory computer-readable medium described herein may further include operations, features, means, or instructions for transmitting a broadcast message that indicates the resource grid.

Some examples of the method, apparatuses, and non-transitory computer-readable medium described herein may further include operations, features, means, or instructions for transmitting a group-specific control channel for a set of UEs including the UE, the group-specific control channel indicating the resource grid.

In some examples of the method, apparatuses, and non-transitory computer-readable medium described herein, the group-specific control channel includes a PDCCH. Some examples of the method, apparatuses, and non-transitory computer-readable medium described herein may further include operations, features, means, or instructions for identifying resources for the scheduled uplink communications based on the resource grid, and monitoring the set of uplink resources including time-frequency resources non overlapping with the set of semi-persistent scheduled resources and the resources for the scheduled uplink communications.

In some examples of the method, apparatuses, and non-transitory computer-readable medium described herein, the scheduled uplink communications for the one or more other UEs may be retransmissions for the one or more other UEs scheduled via resources indicated by the resource grid.

Some examples of the method, apparatuses, and non-transitory computer-readable medium described herein may further include operations, features, means, or instructions for determining a decoding failure of the uplink message based on the monitoring, dynamically configuring a set of retransmission resources for the UE based on the decoding failure, transmitting an indication of the set of dynamically configured retransmission resources to the UE, and monitoring the set of dynamically configured retransmission resources for a retransmission of the uplink message from the UE.

In some examples of the method, apparatuses, and non-transitory computer-readable medium described herein, the set of dynamically configured retransmission resources may be associated with a power boost.

DETAILED DESCRIPTION

Figure 1:
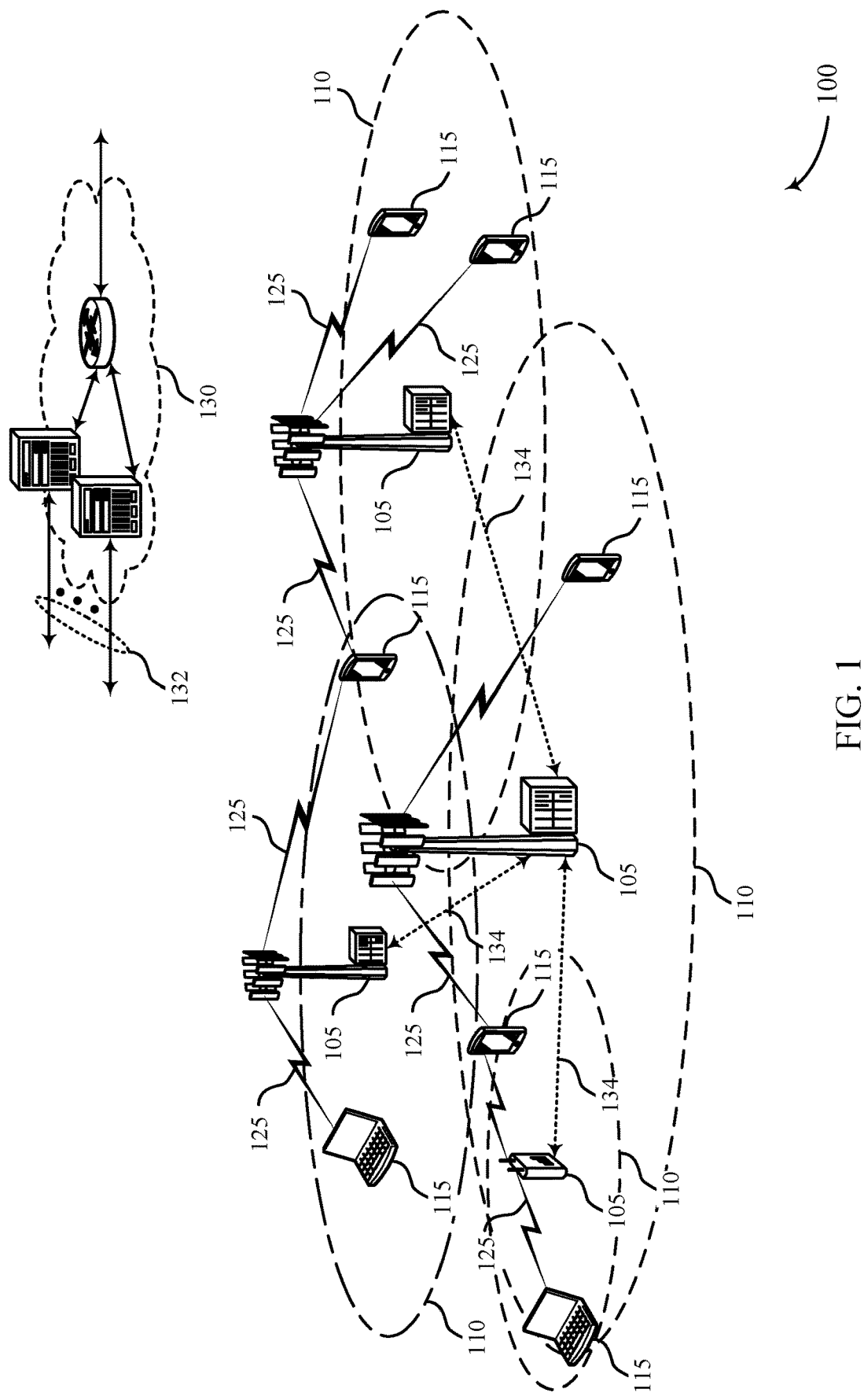
FIG. 1 illustrates an example of a wireless communications system that supports resource scheduling techniques in wireless systems in accordance with aspects of the present disclosure.

A base station may configure a user equipment (UE) with semi-persistent resources based on a semi-persistent scheduling (SPS) configuration. The semi-persistent resources may be for uplink transmissions, downlink transmissions, or both. The UE and base station may implement techniques to improve the assignment or reassignment of resources in SPS operations. The UE and base station may also implement techniques which support enhanced flexibility for modulation and coding scheme (MCS) assignments. For downlink transmissions, the UE may perform blind decoding on the downlink semi-persistent resources. Performing blind decoding on the semi-persistent resources may support the base station to use a different value for an MCS without re-assigning resources to the UE or transmitting another grant in downlink control information. For example, the base station may use a different number of symbol periods or resource element groups and use a different MCS than the MCS originally configured upon initialization of the SPS. In some cases, a configured slot or mini slot structure may support flexible MCS assignments. In some cases, one mini slot may include four orthogonal frequency division multiplexing (OFDM) symbols. An MCS for scheduling may be determined on a mini slot by mini slot basis. In some cases, performing blind decoding on the SPS resources at the UE may support flexible scheduling for downlink traffic.

For uplink transmissions, the base station may transmit an indication of a resource grid to the UE. The resource grid may indicate how resources are assigned for one or more UEs (e.g., including the receiving UE) according to the SPS configuration. The UE may identify the resource grid and determine uplink resources available for uplink transmission based on an SPS assignment for the UE and the resource grid. This may support the UE to use a different MCS for uplink transmissions than the one originally configured by the SPS configuration. In some cases, the base station may configure conditional and non-conditional SPS resources, where the use of the conditional SPS resource is based on scheduling for uplink retransmission. In some cases, the uplink retransmissions may be scheduled by a group downlink control channel transmission. Having the flexibility of using different MCSs may improve adaptability regarding the scheduling of wireless resources for multiple UEs, and resources may be more easily reassigned. SPS may be implemented, and the UE may perform blind-decoding to decrease downlink control information (DCI) overhead as well as to address decoding errors on the downlink. Dynamic scheduling of retransmissions on uplink may improve reliability in low latency systems.

In some cases, the techniques for uplink SPS may rely on preassigned resources for a first set of transmissions and utilizing dynamic scheduling for retransmissions. In some cases, the UE and base station may utilize a closed loop absolute power control correction to improve reliability and decrease overall power loss in the system. Closed loop power control correction may decrease power loss during transmissions by including feedback input from a base station. In some cases, the feedback may be a command that includes dynamic control by Transmission Power Control (TPC). The dynamic control by TPC may include either a preconfigured resource boost or a preconfigured power boost, or both. In each of these examples, reliability may be improved by decreasing overall power loss but may use more resources to implement power control. Dynamic resource usage on the uplink may allow for flexible scheduling for uplink traffic.

The techniques for implementing uplink SPS may include configuring conditional and non-conditional SPS resources. In some cases, the UE may rely on a broadcast of an available resource grid after retransmissions are scheduled.

The base station may schedule resources for multiple UEs and may transmit an indication of the scheduling to the UEs in a group physical downlink control channel (PDCCH). The group PDCCH may include a bit map, which may indicate which regions of a common resource space are scheduled for transmissions and retransmissions. The UEs may follow the scheduling for transmissions and retransmissions and may use unassigned, available resources for dynamic scheduling of retransmissions. The scheduled resources may be examples of non-conditional SPS resources and the resources available for dynamic scheduling for the UEs may be examples of conditional SPS resources. If a group PDCCH is used to indicate or schedule retransmissions, the conditional resources may be used for retransmission if they are available. If the conditional resources are not available, non-conditional resources may be scheduled for both transmissions and retransmissions.

The group PDCCH may be transmitted in a slot or mini slot schedule for downlink communications and may be transmitted to multiple UEs. As described, the group PDCCH may include scheduling information for initial transmissions and retransmissions for multiple UEs. The available resources may include a first frequency band that may be split in to a second and third frequency band. The first and second frequency bands may be variable in length depending on resources assigned by the base station and may vary for different time periods and for every mini slot scheduled. The first frequency band may be designated as reserved, non-conditional resources for retransmission assigned to some UEs. The second frequency band may be unassigned and therefore available as conditional resources available for use by UEs to widen the frequency band used for the designated retransmission. The conditional resources may be used to scale up the non-conditional frequency band used for retransmission as scheduled by the base station. The conditional resources may also be known as scaled or rate-matched SPS uplink assignments.

In the case of SPS on downlink, blind decoding may allow for flexible MCS selection, as well as the ability to avoid unnecessary signaling overhead. Signaling overhead in other strategies may include signals that describe when and where downlink messages will be sent. Blind decoding may involve fewer signals than other downlink strategies, because blind decoding may include a UE attempting to use all control channel elements (CCEs) of the common search space in order to decode a PDCCH, rather than receiving signals indicating the scheduling of transmissions. Because the UE does not utilize additional signaling, blind decoding may avoid signaling overhead and therefore decrease associated reliability issues, such as interference and latency. Using blind decoding to assign resources may also allow assigned resources to hop, which may avoid the constant sharing of the same set of resources with the same set of UEs and allow for more flexible resource usage. The UE in this case may also be configured with multiple occasions for physical downlink shared channel (PDSCH) decoding.

In one example, a wireless communications system utilizing blind decoding for flexible MCS on downlink may use a combination of different frequency and time schedules for different UEs. A base station may perform the resource scheduling assignments, and UEs may utilize blind decoding to monitor the common search space.

In one example, the base station may assign downlink resources for a first UE. The downlink resources may be assigned to multiple different time periods and frequency bands. In a first example, the downlink resources may occur during a first time period of a first duration in a first frequency band. The first time period may be equal to the duration of one mini slot. In a second example, the downlink resources may be assigned to a second time period of a first duration in the first frequency band. The second time period may have the same duration as the first time period and may be equal to one mini slot. In a third example, the downlink resources may be assigned to the first time period and to a second frequency band, which may be twice the width of the first frequency band, and also include the first frequency band. In a fourth example, the downlink resources may be assigned to the second time period and the second frequency band. In a fifth example, the downlink resources may be assigned to a third time period and the first frequency band. The third time period may include the first and second time periods and may be equal to two mini slots. In a sixth example, the downlink resources may be assigned to the first and second time periods and the second frequency band. In a last example, the downlink resources may be assigned to the first and second time periods and to the first and second frequency bands.

The base station may also assign multiple sets of downlink resources for multiple UEs. In the strategy of blind decoding, multiple UEs may monitor the same common search space, bit map, or downlink group grant transmission. When scheduling downlink for multiple UEs, the base station may schedule resources for a first UE. For example, the resources scheduled for the first UE may be a first frequency band and a first time duration equal to the duration of mini slot. The base station may schedule resources for a second UE, which may be a second frequency band of the length of half of the first frequency band, and a second time duration equal to the duration of a mini slot. The base station may schedule resources for a third UE which may be a third frequency band of the length of the second frequency band, and a third time duration that may span the first and second time durations and therefore two mini slots. The base station may schedule resources for a fourth UE, which may be the third frequency band over a fourth time duration that may equal the time duration of the third time duration, but which may occur during a different time. The base station may also schedule a retransmission for the first UE, which may be during the fourth time duration and may use the first frequency band.

Blind decoding may provide enhanced communications at the base station as well as at the UEs. When using dynamic scheduling of retransmissions on uplink, blind decoding at a base station (e.g., a gNB) may be used to address the case where a group PDCCH is missed. In this case, the base station may blind decode the transmissions from the UEs, since the UEs may not have received the group PDCCH and may not be transmitting during the designated resources for each individual UE.

Aspects of the disclosure are initially described in the context of a wireless communications system. Aspects are then described with respect to frame structures and a process flow. Aspects of the disclosure are further illustrated by and described with reference to apparatus diagrams, system diagrams, and flowcharts that relate to resource scheduling techniques in wireless systems.

FIG. 1 illustrates an example of a wireless communications system 100 that supports resource scheduling techniques in wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multi-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini slots containing one or more symbols. In some instances, a symbol of a mini slot or a mini slot may be the smallest unit of scheduling. Each symbol may vary in duration depending on the subcarrier spacing or frequency band of operation, for example. Further, some wireless communications systems may implement slot aggregation in which multiple slots or mini slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may implement techniques which provide flexibility in selecting the MCS and resources selected for scheduling transmissions between a UE 115 and a base station 105. Flexibility between different MCSs may improve adaptability regarding the scheduling of wireless resources for multiple UEs 115, and resources may be more easily reassigned. SPS and blind-decoding at a UE 115 may be used to decrease DCI overhead as well as to address decoding errors on the downlink. Dynamic scheduling of retransmissions on uplink may improve reliability in low latency systems.

Figure 2:
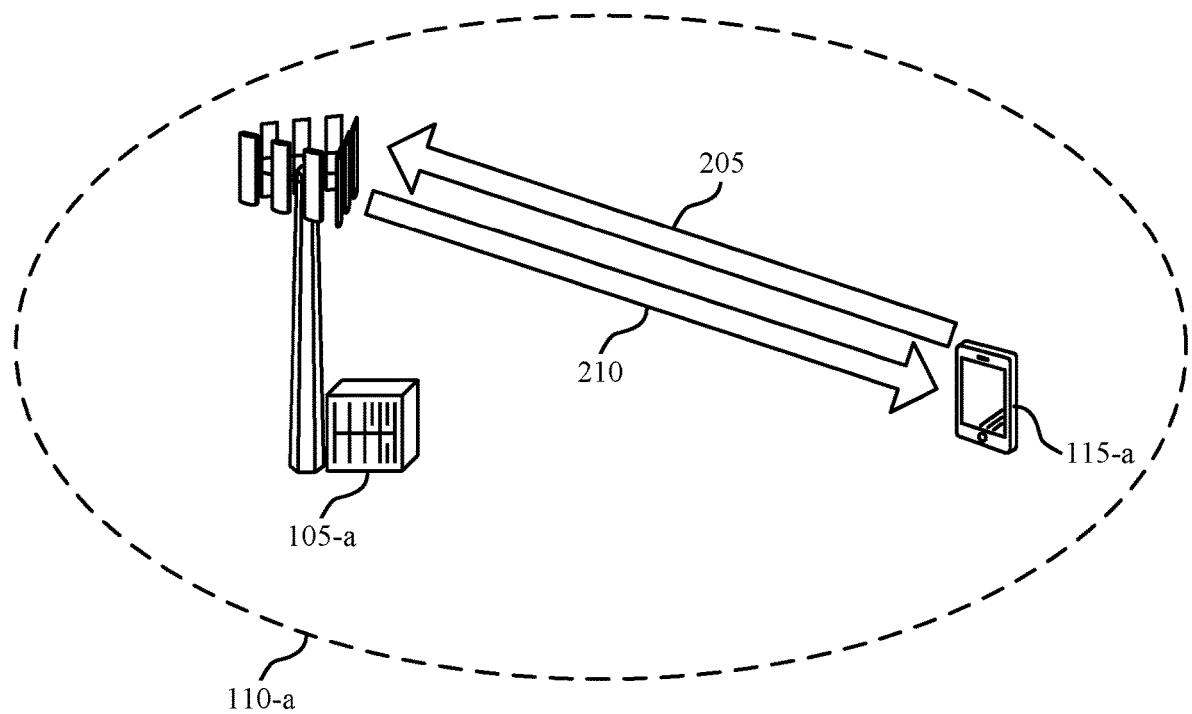
FIG. 2 illustrates an example of a wireless communications system that supports resource scheduling techniques in wireless systems in accordance with aspects of the present disclosure.

FIG. 2 illustrates an example of a wireless communications system 200 that supports resource scheduling techniques in wireless systems in accordance with aspects of the present disclosure. In some examples, wireless communications system 200 may implement aspects of wireless communications system 100. UE 115-a may communicate with base station 105-b. UE 115-a may transmit data and control information on an uplink channel 205. UE 115-a may receive data and control information on the downlink channel 210 transmitted by base station 105-a. Base station 105-a may provide a cell which spans coverage area 110-a, such that UEs 115 may be served by base station 105-a within the coverage area 110-a.

Wireless communications system 200 may support low latency communications between base stations 105 and UEs 115. For example, UE 115-a and base station 105-a may communicate using a low latency communications scheme, such as ultra-reliable low latency communications (URLLC). DCI decoding may be a significant factor when ensuring quality of service for low latency communications. DCI may include grants, scheduling information, or other control information for a UE 115. To reduce overhead allotted for transmitting DCI, some base stations 105 in the wireless communications system 200 may configure semi-persistent resources and implement SPS. Semi-persistent resources may be configured semi-statically. In some cases, the DCI or resource grants may also configure an MCS for UEs 115 using the semi-persistent resources.

The wireless communications system 200 may be subject to varying channel conditions (e.g., interference between devices, intra-device interference, coverage area or power limitations). As the channel conditions change, the configured MCS may not be sufficient for the new channel conditions. For example, in good channel conditions, communications may be successful even with little coding. However, in poor channel conditions, transmissions using the same amount of little coding may be more susceptible to interference such that the transmissions are not successful. Therefore, flexibility in selecting the MCS and flexibility in scheduling resources for uplink and downlink transmissions between a UE and a base station may lead to improved throughput and success rate of communications. Flexibility between different MCSs may improve adaptability regarding the scheduling of wireless resources in time and in frequency for multiple different UEs, and the wireless resources may be more easily reassigned from one UE to one or more other UEs. However, if the MCS is configured with a semi-static configuration for the semi-persistent resources, changes to the MCS may also be semi-static. Therefore, a conventional base station 105 may not be able to dynamically adjust the MCS for a conventional UE 115 when channel conditions of the conventional UE 115 change. Or, the conventional base station 105 would transmit another grant to the conventional UE 115, which may affect resource allocation and assignment for other UEs 115.

UEs 115 and base stations 105 as described herein, including UE 115-a and base station 105-a, may implement techniques for efficient uplink and downlink resource management as well as slot structures to enable variable MCS assignment. In some cases, the resource management techniques may include a blind decoding strategy for UEs 115 to decode downlink transmissions on the downlink channel 210. In some cases, the resource management techniques may include dynamic scheduling to improve resource allocation and flexibility for uplink transmissions on the uplink channel 205. SPS techniques for the reassignment of resources may also include employing a slot structure or mini slot structure, or both, to enable flexible MCS assignments. For example, one mini slot may include four OFDM symbols. In some cases, MCS may be determined on a mini slot by mini slot basis.

In some cases, dynamic resource allocation on the uplink may support flexible scheduling for uplink traffic. UE 115-a may use preassigned resources for a first set of transmissions (e.g., initial transmissions). In some cases, UE 115-a and other UEs 115 may not select resources blindly, as this may lead to uplink collisions if two UEs 115 select the same uplink resources. UE 115-a may use a closed loop absolute power control correction to improve reliability for the uplink transmissions.

Retransmissions of the first set of transmissions may either also use preconfigured resources or be dynamically scheduled. For example, the retransmissions may use pre-configured resources, power boost, or both, to improve reliability. In some other examples, base station 105-a may configure conditional SPS resources, and UE 115-a may determine the dynamic uplink resource scheduling based on a broadcast of an available resource grid. In some cases, the indication of the resource grid may be signaled as a part of a group downlink control channel signaling for scheduled retransmissions. The SPS assignment may include a conditional resource and a non-conditional resource. Examples of this are described in more detail in at least FIG. 5.

In some cases, base station 105-a may schedule designated resources for multiple UEs 115. Base station 105-a may transmit a resource allocation to UEs 115 in a control channel, such as a PDCCH in a downlink transmission. In some cases, the control information may be transmitted in a group PDCCH. The group PDCCH may include bit map information, and some regions of a common resource space may be scheduled for transmissions and retransmissions for one or more UEs 115. The scheduled regions for transmission and retransmission from UEs 115 may also be referred to as non-conditional resources. UEs 115 may transmit and retransmit on uplink resources and receive on downlink resources according the resource allocation indicated in the group PDCCH. UEs 115 may transmit and retransmit on uplink resources using the scheduled resources and may also retransmit on non-allocated resources in a conditional basis. The non-allocated resources may be configured for dynamic usage by UEs 115. The non-allocated resources may also be known as conditional resources. If non-allocated resources are not available, the allocated resources may be used according to scheduling by UEs 115 for both transmissions and retransmissions.

The uplink resource allocation may include allocating mini slots of time durations and frequency ranges for uplink transmissions by UEs 115. Each UE 115 may have allocated mini slots that overlap with other UEs or may have allocated frequency ranges that overlap with other UEs 115, but a UE may not have a mini slot allocation that overlaps with another UE's mini slot allocation and a frequency allocation that overlaps with another UEs frequency allocation. UEs may also be allocated more than one mini slot of transmission uplink resources.

For example, a first UE 115 may be allocated resources that include a first mini slot and a first frequency range. A second UE 115 may be allocated resources of two mini slots, where one of the two mini slots is the same first mini slot that is allocated for the first UE. The uplink transmissions for the second UE 115 may be allocated to a different frequency range. A third UE may also be allocated uplink resources. The third UE may be allocated resources in a third mini slot and may also be allocated to the first frequency range.

UE 115-a may have a set of allocated resources that are non-conditional resources. The non-conditional resources may be adjacent to a set of conditional resources that were not allocated to any UE 115 according to the scheduling information contained in the group PDCCH transmission. UE 115-a may transmit initial transmissions and retransmissions in the allocated non-conditional resources and may also dynamically utilize non-allocated conditional resources for retransmissions. UE 115-a may retransmit on conditional resources in order to widen the frequency range used for retransmissions.

A UE 115 may use a blind decoding strategy to receive downlink SPS transmissions on the downlink channel 210. For the blind decoding strategy, the UE 115 may attempt to use all control channel elements (CCEs) of the common search space in order to decode a PDCCH, rather than receiving signals indicating the scheduling of transmissions from a base station 105. The UE 115 may be configured with multiple occasions for PDSCH decoding and perform blind decoding at each decoding occasion to receive a downlink transmission. Downlink transmissions may be transmitted at the different occasions with different MCSs. Because the UE 115 does not receive additional signaling, blind decoding may reduce a signaling overhead associated with scheduling. In some cases, this may also increase reliability, and reduce opportunities for interference and increased latency. In some cases, using blind decoding with downlink SPS may support flexible scheduling for downlink traffic. The UE 115 may implement frequency hopping to avoid constant sharing of resources with the same set of UEs 115.

Figure 3:
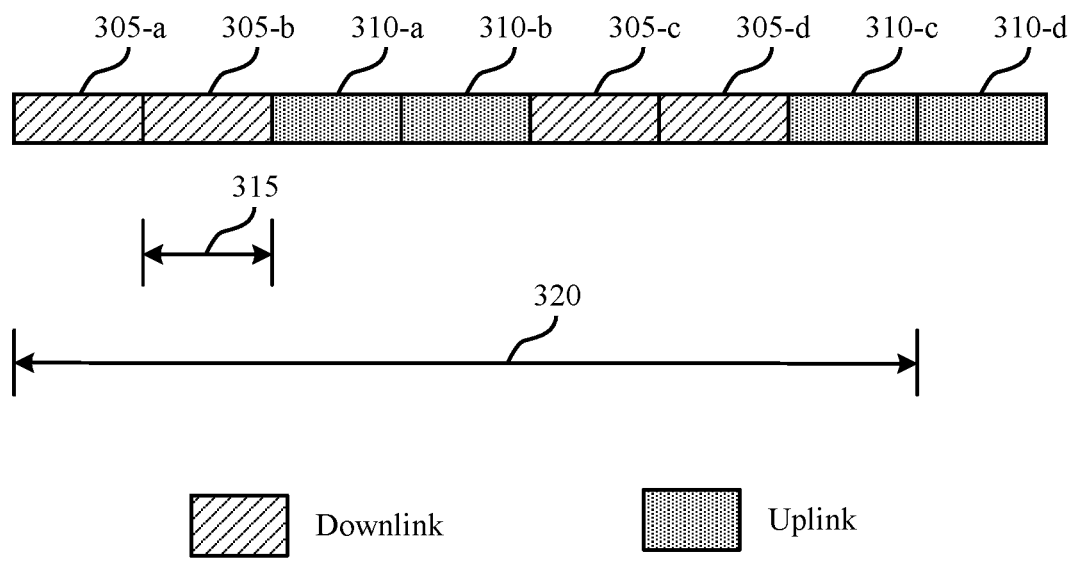
FIG. 3 illustrates an example of a frame structure that supports resource scheduling techniques in wireless systems in accordance with aspects of the present disclosure.

FIG. 3 illustrates an example of a frame structure 300 that supports resource scheduling techniques in wireless systems in accordance with aspects of the present disclosure. In some examples, frame structure 300 may implement aspects of wireless communications systems 100 or 200. Frame structure 300 may be an example of a mini slot frame structure of SPS configured resources for scheduling downlink and uplink communication between a base station and a UE.

A downlink slot 305 may be an example of a mini slot (or a slot, one or more symbols, etc.). Each downlink slot 305 may include a number of OFDM symbols spanning time duration 315. For example, a downlink slot 305 may include 4 OFDM symbols spanning the time duration 315. An uplink slot 310 may be an example of an uplink time slot and may, in some cases, be an example of a mini slot (or a slot, symbol, etc.). The uplink slots 310 may include a configured number of OFDM symbols. For example, an uplink slot 310 may include 4 OFDM symbols. In some cases, the length (e.g., in time) of an uplink slot 310 may be the same or different from the length of a downlink slot 305. For example, both uplink slots 310 and downlink slots 305 may span four OFDM symbol periods.

The frame structure 300 indicates scheduling for uplink and downlink communication between one or more UEs and one or more base stations. The scheduling may include two mini slots for of downlink transmission (e.g., downlink slots 305-a and 305-b) followed by two mini slots for uplink communication (e.g., uplink slots 310-a and 310-b), continuing with two mini slots for downlink communication (e.g., downlink slots 305-c and 305-d) and two mini slots for uplink communication (e.g., uplink slots 310-c and 310-d). This alternating pattern may continue for any duration across one or more slots, subframes, frames, or the like.

In some examples, the frame structure 300 may be determined by a base station 105 when scheduling downlink and uplink communications for one or more UEs. The scheduling determination may be communicated in a downlink transmission from the base station 105 to the one or more UEs (e.g., via a broadcast channel). The time duration 320 may be an example of an IoT URLLC delay budget. In some cases, the time duration 320 may span 7 mini slots. This may, for example, correspond to 28 OFDM symbols in cases where a mini slot includes 4 OFDM symbols.

Generally, the frame structure 300 shows an example of a possible configuration semi-persistent resources. For example, a base station 105 may schedule a set of downlink resource (e.g., the downlink slots 305) and a set of uplink resources and the uplink resources (e.g., the uplink slots 310). By implementing an SPS configuration, the base station and UE may reduce scheduling overhead. Other scheduling configurations may be implemented in other examples. For example, there may be a greater or lesser number of downlink slots 305 than uplink slots 310. A base station and one or more UEs described herein may communicate according to the frame structure 300 to implement techniques described herein. For example, a UE may perform blind decoding on resources configured during a downlink slot 305. Similarly, a first UE may determine resources for uplink SPS transmissions based on a resource grid transmitted by the base station which indicates schedule uplink communications for one or more UEs (e.g., including the first UE). The first UE may then transmit an uplink message using resources configured during one or more uplink slots 310 based on the resource grid.

Figure 4:
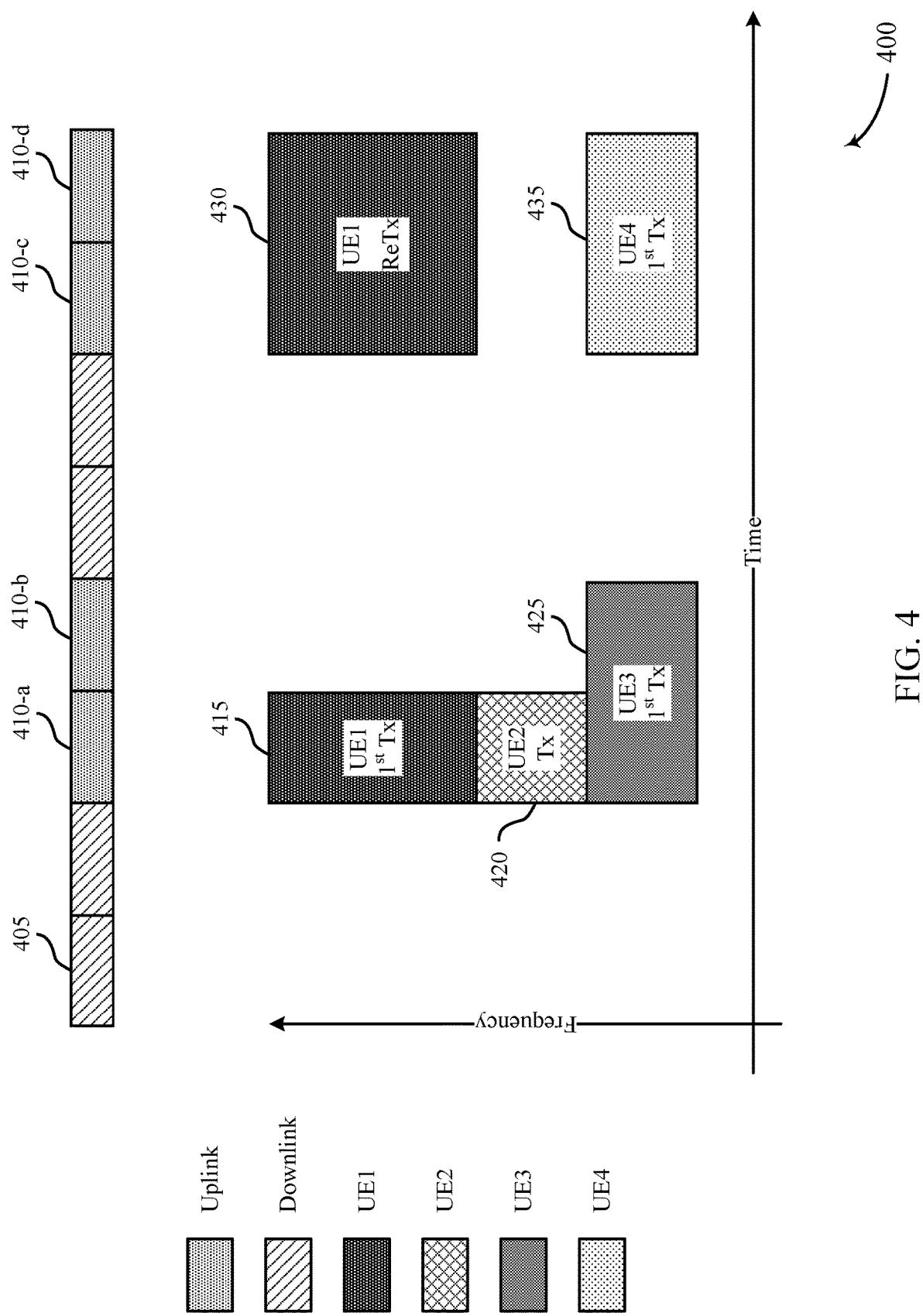
FIGS. 4 through 7 illustrate examples of semi-persistent resource configurations that support resource scheduling techniques in wireless systems in accordance with aspects of the present disclosure.

FIG. 4 illustrates an example of a semi-persistent resource configuration 400 that supports resource scheduling techniques in wireless systems in accordance with aspects of the present disclosure. In some examples, semi-persistent resource configuration 400 may implement aspects of wireless communications systems 100 or 200.

Semi-persistent resource configuration 400 may include an example of a mini slot structure for uplink communication for multiple UEs. A base station may schedule resources for one or more UEs. The base station may transmit DCI conveying the scheduling on a group PDCCH, which may be received by the one or more UEs. In some cases, each of the one or more UEs may be scheduled to communicate in some uplink mini slot in the mini slot communication structure. The mini slot communication structure may be an example of a structure for a set of SPS resources. The mini slot structure may include downlink mini slots 405 and uplink mini slots 410. Each downlink mini slot 405 or uplink mini slot 410 may include one or more OFDM symbols.

In one example, a set of uplink mini slots 410 may include allocated communications for one or more UEs 115. For example, a first UE may be allocated resource block 415 for uplink communications. The resources scheduled for the first UE may span a first frequency range and a first time duration equal to the duration of uplink mini slot 410-a. A second UE may be allocated resource block 420 for uplink communications. The base station may schedule resources for the second UE, which may span a second frequency range of a length less than first frequency range and a second time duration equal to the duration of uplink mini slot 410-a. A third UE may be allocated resource block 425 for uplink communications. The base station may schedule resources for the third UE which may be a third frequency range of a similar range of the second frequency range and a third time duration that may span the first and second time durations and therefore two mini slots, for example uplink mini slot 410-a and mini slot 410-b. A fourth UE may be allocated resources 435. The allocated resources 435 may align with uplink mini slots 410-c and 410-d and may be allocated to a fourth frequency range of similar length as the third frequency range. The first UE may also be allocated resources 430 for a retransmission. The resources 430 may be scheduled to occur during uplink mini slots 410-c and 410-d and may be allocated to a fourth frequency range that may overlap with the first frequency range.

While a UE may be able to perform blind decoding for downlink transmissions, blindly selecting resources to use for an uplink transmission may lead to collisions with other UEs. Therefore, the UE may rely on preassigned resources for initial transmissions. The UE may dynamically be scheduled for retransmissions. In some cases, the UE may use a closed-loop, absolute power control correlation. Retransmissions may also have preconfigured resources or a power boost to improve reliability, or both.

Figure 5:
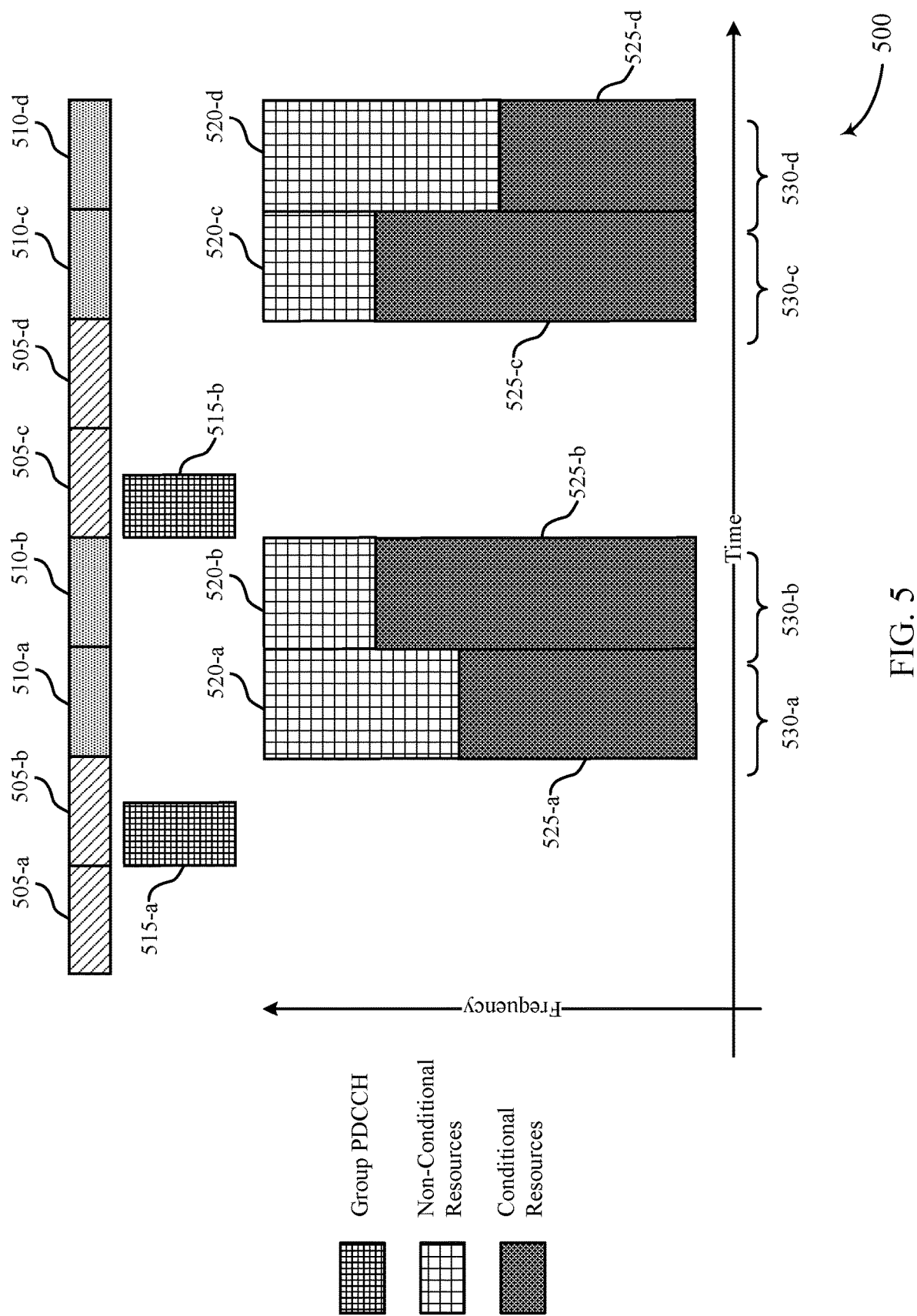

FIG. 5 illustrates an example of a semi-persistent resource configuration 500 that supports resource scheduling techniques in wireless systems in accordance with aspects of the present disclosure. In some examples, semi-persistent resource configuration 500 may implement aspects of wireless communications systems 100 or 200.

The semi-persistent resource configuration 500 may be an example of a mini slot SPS structure. Mini slots 505-a, 505-b, 505-c, and 505-d may be allocated for downlink communication, and mini slots 510 may be allocated for uplink communication. A base station may transmit a group PDCCH 515 during a mini slot 505. The group PDCCH 515 may include a bit map indicating resource assignments for a common resource space. If a group PDCCH 515 is used for scheduling a retransmission, the remaining, if any, conditional resources 525 may be used as well. The bit map, or information included in the group PDCCH 515, may indicate how some regions of the common resource space are allocated. For example, some of the common resource space may be configured to be used for retransmissions (e.g., non-conditional resources 520) while other resources of the common resource space may be available for SPS uplink assignments (e.g., conditional resources 525). Therefore, the group PDCCH 515 may, in some cases, indicate resource allocations for transmissions and retransmissions. Some resources of the common resource space may remain unassigned and may not be allocated for use by a particular UE for transmission or retransmission.

In some cases, the group PDCCH 515 may indicate a set of available resources 530 (e.g., uplink resources) to one or more UEs. The set of available resources 530 may span first frequency range. In some cases, the set of available resources may include a first frequency range for retransmissions (e.g., non-conditional resources 520) and a second frequency range for SPS uplink assignments (e.g., conditional resources 525). In some cases, the non-conditional resources 520 may be configured as reserved resources for retransmission assigned to some UEs. The conditional resources 525 may be unassigned, and this may be indicated in the group PDCCH 515 via the bit map information or resource grid that indicates scheduled uplink communications. The conditional resources 525 (e.g., as unallocated resources) may therefore be available as conditional resources which can be used by UEs. UEs may therefore be use the non-conditional resources 520 for scheduled retransmissions and may use the conditional resources 525 for conditional transmissions (e.g., initial transmissions or retransmissions). This may support UEs to use a wider frequency range (e.g., for retransmissions). The conditional resources 525 may be used to scale up the non-conditional frequency range used for retransmission as scheduled by the base station. The conditional resources 525 may be used for scaled or rate-matched SPS uplink assignments. For example, if a UE uses the conditional resources 525, the UE may rate match around the non-conditional resources 520 which are used for a retransmission (e.g., which may be transmitted by another UE).

In an example, base station may transmit group PDCCH 515-a. Group PDCCH 515-a may include a bit map describing first resource set 530-a and second resource set 530-b. For example, group PDCCH 515-a may indicate that non-conditional resources 520-a and 520-b are schedule for retransmissions. Group PDCCH 515-a may also indicate a set of conditional resources 525-a and 525-b, which may be used by a UE for an uplink transmission. If a UE uses the conditional resources 525-a or 525-b, the UE may rate match around the conditional resources 525 which are adjacent to the conditional resource 525 and transmitted in in the same mini slot 510. In some cases, conditional resources 525-a may span a different frequency range than conditional resources 525-b. In this example, there may be more resources allocated for retransmissions in mini slot 510-a than in mini slot 510-b. This may also correspond to a larger resource available for conditional resources in mini slot 510-b (e.g., corresponding to conditional resources 525-b, which is larger than non-conditional resources 520-b).

At a later occasion of downlink semi-persistent resources (e.g., mini slot 505-c), the base station may transmit another group PDCCH (e.g., group PDCCH 515-b). Group PDCCH

515-*b* may carry a resource grid which indicates resources allocated for a third resource set 530-*c* and a fourth resource set 530-*d*, corresponding to mini slots 510-*c* and 510-*d* respectively. Third resource set 530-*c* may include non-conditional resources 520-*c* and conditional resources 525-*c*. Fourth resource set 530-*d* may include non-conditional resources 520-*d* and conditional resources 525-*d*. Based on the indication in group PDCCH 515-*b*, UEs which receive group PDCCH 515-*b* may be able to use the conditional resources 525 in the third resource set 530-*c* and the fourth resource set 530-*d* for uplink transmissions.

Figure 6:
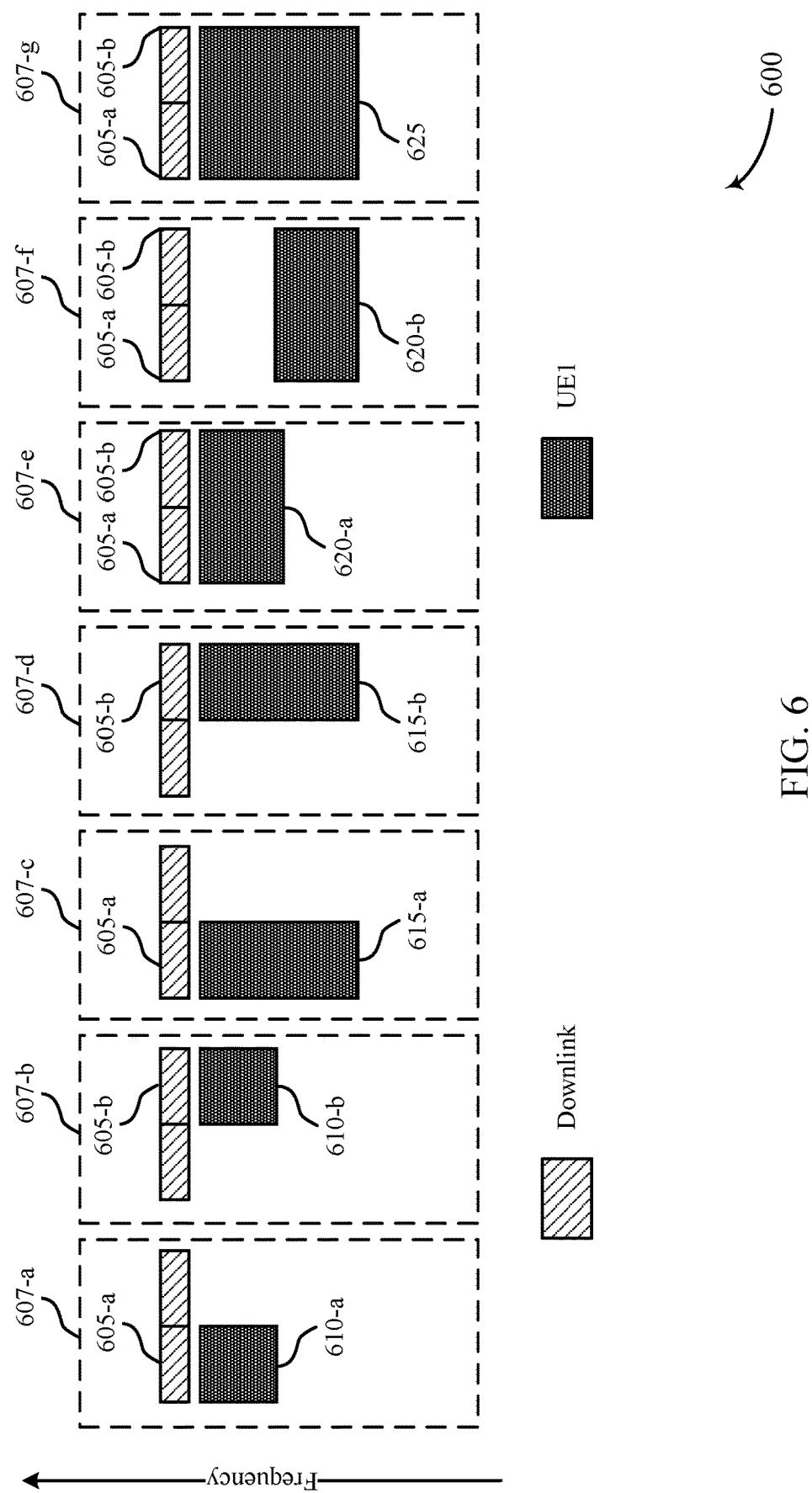

FIG. 6 illustrates an example of a semi-persistent resource configuration 600 that supports resource scheduling techniques in wireless systems in accordance with aspects of the present disclosure. In some examples, semi-persistent resource configuration 600 may implement aspects of wireless communications systems 100 or 200.

The semi-persistent resource configuration 600 may show different examples of downlink resource allocation for a UE. In the scheduled mini slot configuration, there may be two downlink mini slots 605 scheduled, followed by two uplink mini slots. Each set of two downlink mini slots 605 may be allocated for downlink transmissions for one or more UEs. There may be different configurations for different UEs. The different configuration may include different time durations allocated for transmission and different frequency ranges allocated for transmission. The configuration may vary for each UE and may vary through time depending on available and allocated resources in the wireless communications system.

In a first configuration 607-*a*, base station may allocate resources 610-*a* for a UE. In this configuration, resources 610-*a* may be allocated for a first mini slot 605-*a* and a first frequency range. In a second configuration 607-*b*, base station may allocate resources 610-*b* for a UE. In this configuration, resources 610-*b* may be allocated for second mini slot 605-*b* and a frequency range that may be the same as the first frequency range. In a third configuration 607-*c*, base station may allocate resources 615-*a* for a UE. In this case, resources 615-*a* may be allocated to first mini slot 605-*a* and a second frequency range that may be larger than the first frequency range. In a fourth configuration 607-*d*, base station may allocate resources 615-*b* to a UE. In this configuration, resources 615-*b* may be allocated to second mini slot 605-*b* and a frequency range that may be the same as the second frequency range. In a fifth configuration 607-*e*, base station may allocate resources 620-*a* to a UE. Resources 620-*a* may be allocated to first mini slot 605-*a* and second mini slot 605-*b* and may be allocated for a frequency range that may be the same as the first frequency range.

In a sixth configuration 607-*f*, base station may allocate resources 620-*b* to a UE. Resources 620-*b* may be allocated to a first mini slot 605-*a* and a second mini slot 605-*b* and may also be allocated to a third frequency range different from the first frequency range and a subset of the second frequency range. In a seventh configuration 607-*g*, base station may allocate resources 625 to a UE. Resources 625 may be allocated to a first mini slot 605-*a* and a second mini slot 605-*b* and may also be allocated to a frequency range that may be the same as the second frequency range.

Generally, the semi-persistent resource configuration 600 may show how a base station may implement flexible scheduling for downlink traffic if a receiving UE uses blind decoding. The UE may be scheduled with multiple occasions for PDSCH decoding. Therefore, the base station may transmit downlink data transmissions at multiple different PDSCH starting locations using one a variety of different MCS values. The UE may perform blind decoding to receive the PDSCH and downlink data.

Figure 7:
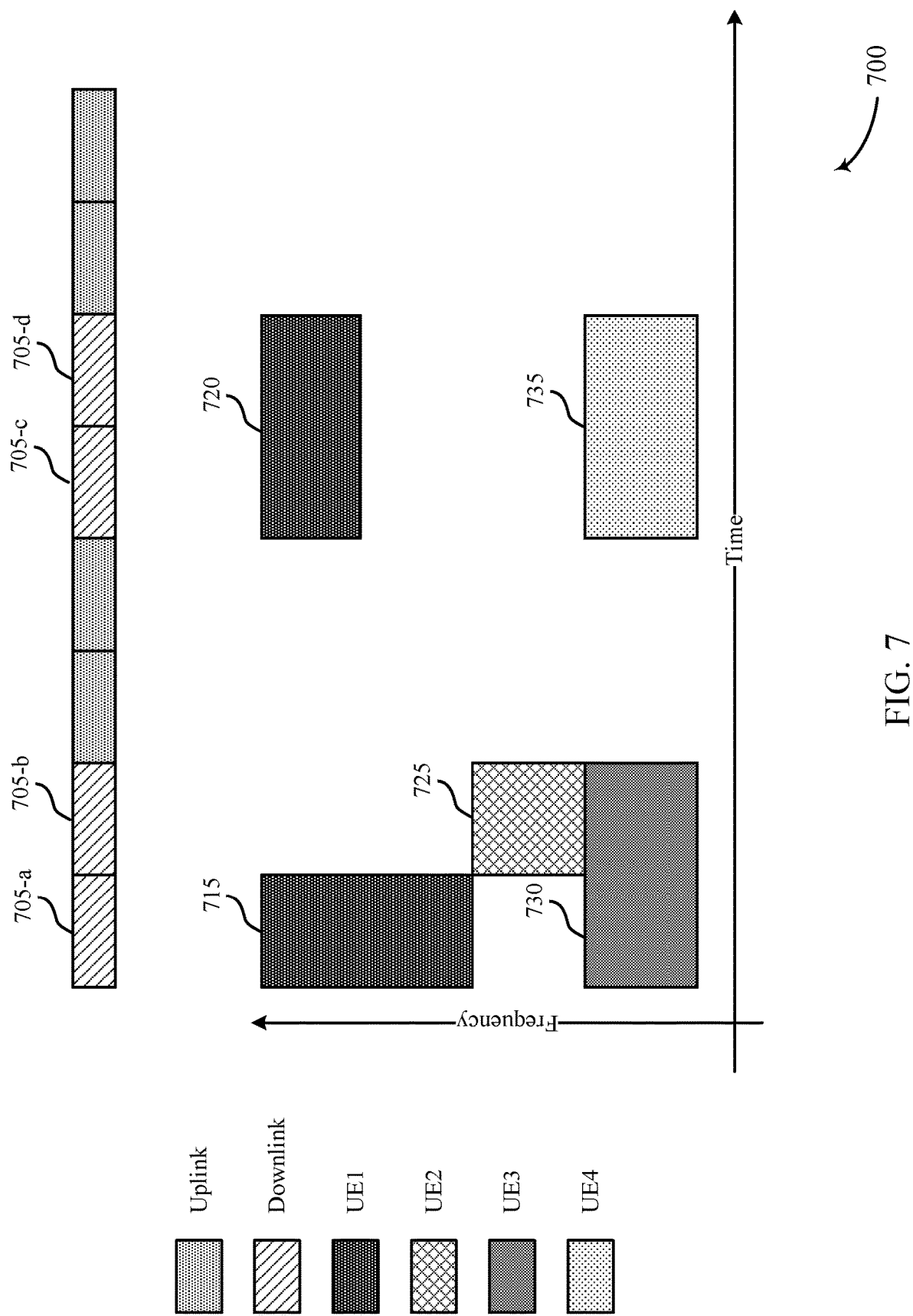

FIG. 7 illustrates an example of a semi-persistent resource configuration 700 that supports resource scheduling techniques in wireless systems in accordance with aspects of the present disclosure. In some examples, semi-persistent resource configuration 700 may implement aspects of wireless communications systems 100 or 200.

The semi-persistent resource configuration 700 may show an example of a mini slot SPS communication allocation structure for downlink transmissions. The SPS mini slot resource allocation for downlink communication as shown in semi-persistent resource configuration 700 may support the use of blind decoding for flexible MCS selection on the downlink. Generally, using blind decoding at a UE for downlink SPS may support flexible MCS selection. A base station may use different MCS values for different UEs and use different resource configurations (e.g., different frequency and time schedules) for different UEs. A base station may schedule resource assignments, and UEs may perform blind decoding on a common search space to receive downlink SPS transmissions. In some cases, assigned resources may hop to avoid constant sharing of resources with the same set of UEs.

The mini slot structure may be determined by base station and may include a set of downlink communication mini slots and uplink communication mini slots. The first downlink communication section may include mini slots 705-*a* and 705-*b*. A base station may allocate downlink resource set 715 to a first UE. Downlink resource set 715 may be allocated for mini slot 705-*a* and a first frequency range. Base station may also allocate downlink resource set 720 for retransmissions to the first UE. Downlink resource set 720 may be allocated for mini slots 705-*c* and 705-*d* and may be allocated for a portion of the first frequency range. Base station may allocate downlink resource set 725 to a second UE. Downlink resource set 725 may be allocated for a second mini slot and a second frequency range. Base station may allocate downlink resource set 730 to a third UE. Downlink resource set 730 may be allocated for mini slots 705-*a* and 705-*b* and may be allocated for a third frequency range. Base station may allocate downlink resource set 735 to a fourth UE. Downlink resource set 735 may be allocated for mini slots 705-*c* and 705-*d* and may be allocated to the third frequency range.

Figure 8:
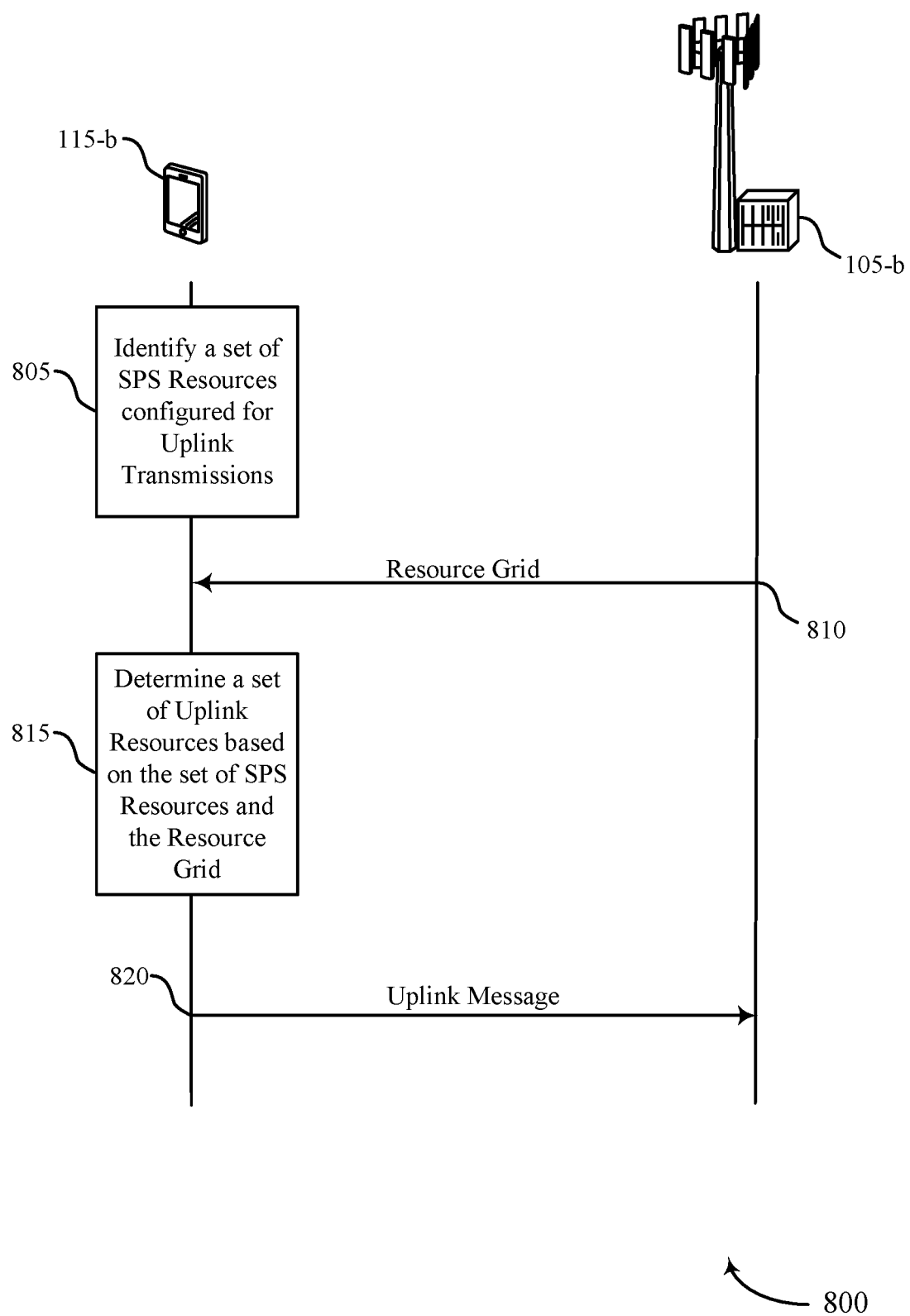
FIG. 8 illustrates an example of a process flow that supports resource scheduling techniques in wireless systems in accordance with aspects of the present disclosure.

FIG. 8 illustrates an example of a process flow 800 that supports resource scheduling techniques in wireless systems in accordance with aspects of the present disclosure. In some examples, process flow 800 may implement aspects of wireless communications systems 100 or 200. The process flow 800 may include UE 115-*b* and base station 105-*b*, which may be respective examples of a UE 115 and a base station 105 as described herein. In some cases, the UE 115 and the base station 105 may be configured for low latency communications, such as URLLC.

At 805, UE 115-*b* may identify a set of SPS resources configured for uplink transmissions by UE 115-*b*. At 810, UE 115-*b* may receive, from base station 105-*b*, a resource grid that indicate scheduled uplink communications for one or more other UEs 115 within the coverage area. In some cases, UE 115-*b* may receive a broadcast message from base station 105-*b*. The broadcast message from base station 105-*b* may indicate the resource grid. In some cases, UE 115-*b* may also receive a group-specific control channel for a set of UEs 115 including UE 115-*b*. The group specific control channel may indicate the resource grid. The group specific control channel may also include a PDCCH.

At 815, UE 115-*b* may determine a set of uplink resources for UE 115-*b* based on the set of SPS resources and the resource grid received from base station 105-*b*. UE 115-*b* may determine the set of uplink resources based on the resources for the scheduled uplink communications, the set of uplink resources including time frequency resources non-overlapping with the set of SPS resources and the resources for the scheduled uplink communications. UE 115-*b* may also determine a set of conditional resources available for UE 115-*b* based on the resources for the scheduled uplink communications, where the set of uplink resource may include a position of the set of conditional resources.

In some cases, UE 115-*b* may identify a set of dynamically configured retransmission resources for UE 115-*b* to utilize after the transmission of an uplink message. UE 115-*b* may retransmit the uplink message via the set of dynamically configured retransmission resources. In some cases, the set of dynamically configured retransmission resources may be associated with a power boost. In this case, the uplink message may be retransmitted in accordance with the power boost.

At 820, UE 115-*b* may transmit an uplink message to base station 105-*b* via the set of uplink resources based on determining the set of uplink resources based on the set of SPS resources and the resource grid received from the base station. The transmission may include rate-matching and scaling the uplink message across the set of uplink resources. The set of uplink resources may include the set of SPS resources. The set of uplink resources may include additional resources different from the set of SPS resources. In some cases, the scheduled uplink communications for the one or more other UEs 115 may be retransmission for the one or more other UEs 115 scheduled via resources indicated by the resource grid.

Figure 9:
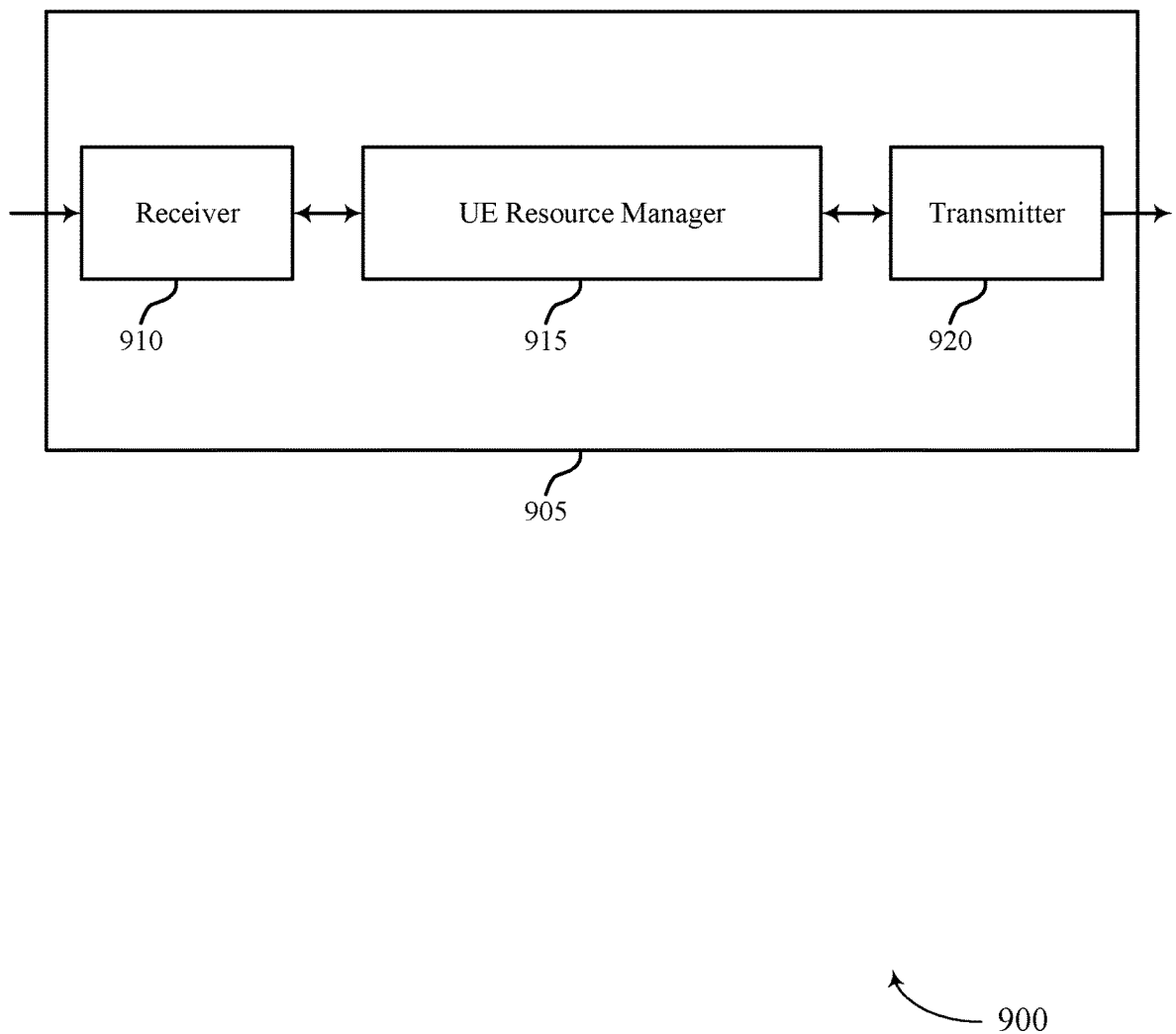
FIGS. 9 and 10 show block diagrams of devices that support resource scheduling techniques in wireless systems in accordance with aspects of the present disclosure.

FIG. 9 shows a block diagram 900 of a device 905 that supports resource scheduling techniques in wireless systems in accordance with aspects of the present disclosure. The device 905 may be an example of aspects of a UE 115 as described herein. The device 905 may include a receiver 910, a UE resource manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource scheduling techniques in wireless systems, etc.). Information may be passed on to other components of the device 905. The receiver 910 may be an example of aspects of the transceiver 1215 described with reference to FIG. 12. The receiver 910 may utilize a single antenna or a set of antennas.

The UE Resource Manager 915 may identify a set of semi-persistent scheduled resources configured for uplink transmissions by the UE, receive, from a base station, a resource grid that indicates scheduled uplink communications for one or more other UEs, determine a set of uplink resources for the UE based on the set of semi-persistent scheduled resources and the resource grid, and transmit an uplink message to the base station via the set of uplink resources. The UE Resource Manager 915 may be an example of aspects of the UE Resource Manager 1210 described herein.

The UE Resource Manager 915, or its sub-components, may be implemented in hardware, code (e.g., software or firmware) executed by a processor, or any combination thereof. If implemented in code executed by a processor, the functions of the UE Resource Manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE Resource Manager 915, or its sub-components, may be physically located at various positions, including being distributed such that portions of functions are implemented at different physical locations by one or more physical components. In some examples, the UE Resource Manager 915, or its sub-components, may be a separate and distinct component in accordance with various aspects of the present disclosure. In some examples, the UE Resource Manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1215 described with reference to FIG. 12. The transmitter 920 may utilize a single antenna or a set of antennas.

In some examples, the UE resource manager 915 described herein may be implemented as a chipset of a wireless modem, and the receiver 910 and the transmitter 920 may be implemented as sets of analog components (e.g., amplifiers, filters, phase shifters, antennas, etc.) The wireless modem may obtain and decode signals from the receiver 910 over a receive interface, and may output signals for transmission to the transmitter 920 over a transmit interface.

The actions performed by the UE resource manager 915 as described herein may be implemented to realize one or more potential advantages. One implementation may allow a UE 115 to save power and increase battery life by improving flexibility of resource scheduling and improving blind decoding capabilities of the UE 115. The may further improve quality and reliability of service at the UE 115.

Figure 10:
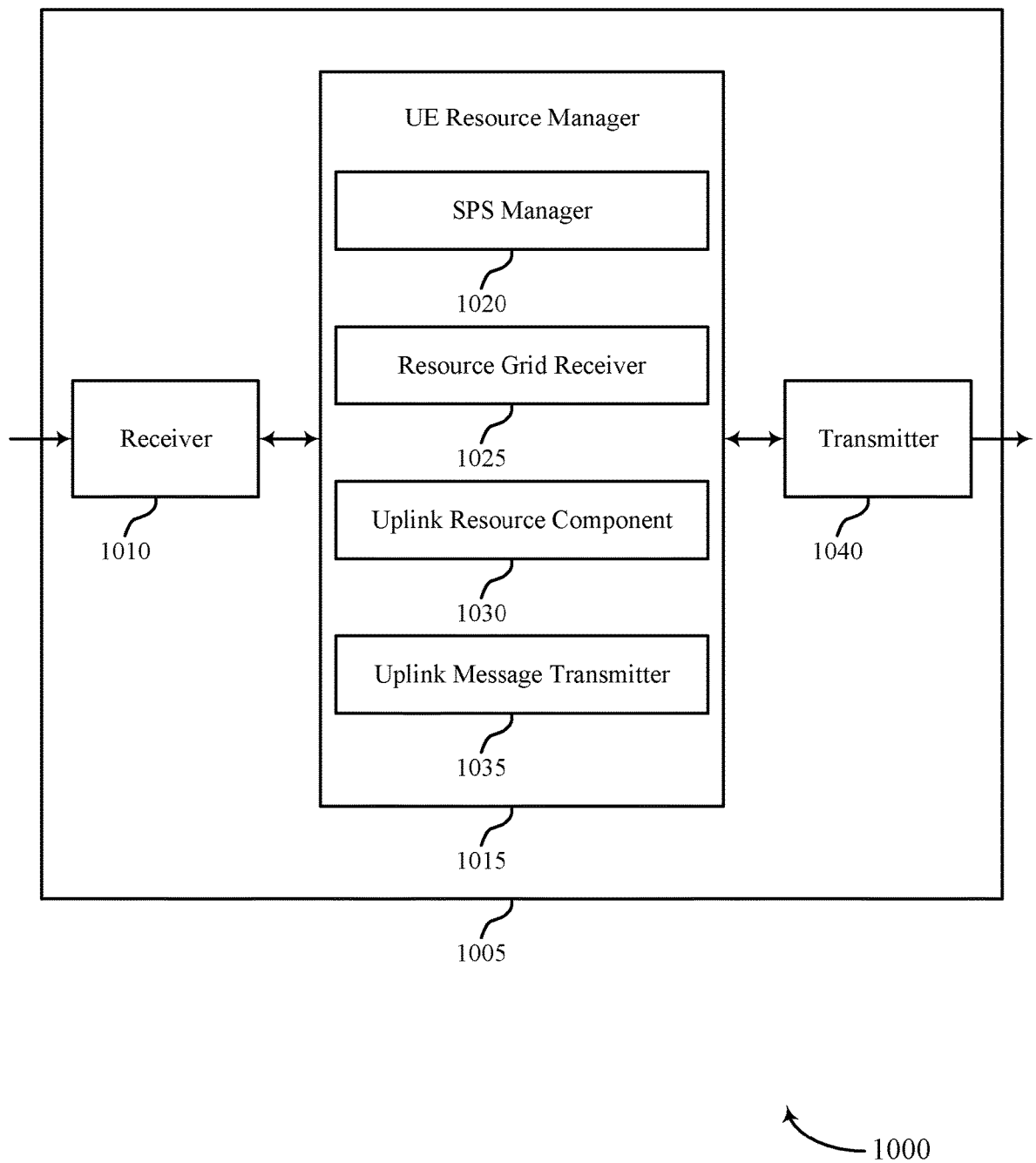

FIG. 10 shows a block diagram 1000 of a device 1005 that supports resource scheduling techniques in wireless systems in accordance with aspects of the present disclosure. The device 1005 may be an example of aspects of a device 905, or a UE 115 as described herein. The device 1005 may include a receiver 1010, a UE resource manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to resource scheduling techniques in wireless systems, etc.). Information may be passed on to other components of the device 1005. The receiver 1010 may be an example of aspects of the transceiver 1215 described with reference to FIG. 12. The receiver 1010 may utilize a single antenna or a set of antennas.

The UE Resource Manager 1015 may be an example of aspects of the UE Resource Manager 915 as described herein. The UE Resource Manager 1015 may include a SPS manager 1020, a resource grid receiver 1025, an uplink resource component 1030, and an uplink message transmitter 1035. The UE Resource Manager 1015 may be an example of aspects of the UE Resource Manager 1210 described herein.

The SPS manager 1020 may identify a set of semi-persistent scheduled resources configured for uplink transmissions by the UE. The resource grid receiver 1025 may receive, from a base station, a resource grid that indicates scheduled uplink communications for one or more other UEs. The uplink resource component 1030 may determine a set of uplink resources for the UE based on the set of semi-persistent scheduled resources and the resource grid. The uplink message transmitter 1035 may transmit an uplink message to the base station via the set of uplink resources.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1215 described with reference to FIG. 12. The transmitter 1040 may utilize a single antenna or a set of antennas.

A processor of a UE 115 (e.g., controlling the receiver 1010, the transmitter 1040, or the transceiver 1215 as described with reference to FIG. 12) may operate the components as described herein to realize one or more potential advantages. For example, the processor of the UE 115 may save power and increase battery life of the UE 115 by operating the receiver 1010 to receive a resource grid indicating scheduled uplink communication for one or more other UEs. The processor of the UE 115 may also determine a set of resources for the UE based on SPS resources and the resource grid. These processes by the processor of the UE 115 may allow the UE 115 to increase reliability and improve efficiency.

Figure 11:
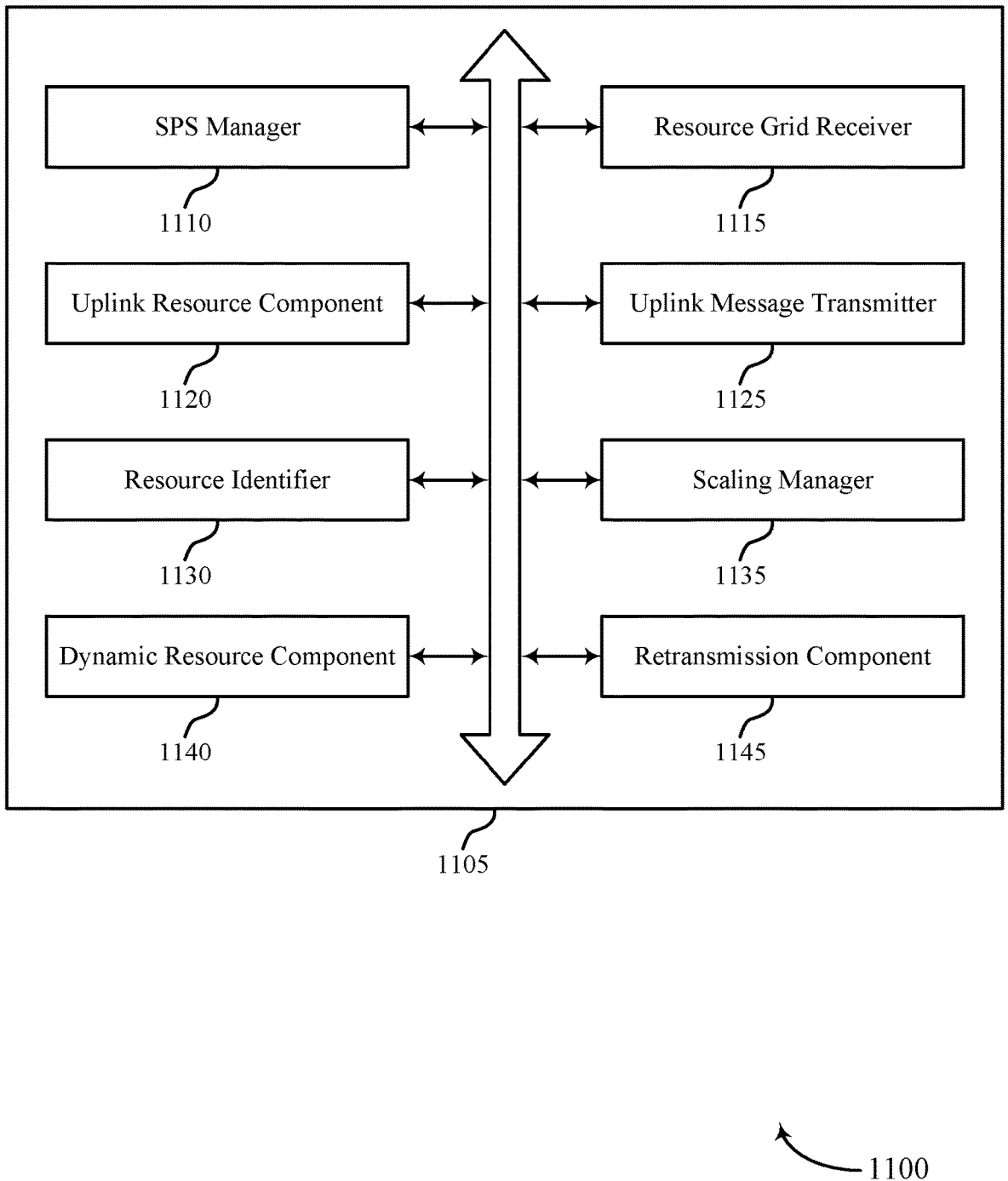
FIG. 11 shows a block diagram of a user equipment (UE) Resource Manager that supports resource scheduling techniques in wireless systems in accordance with aspects of the present disclosure.

FIG. 11 shows a block diagram 1100 of a UE Resource Manager 1105 that supports resource scheduling techniques in wireless systems in accordance with aspects of the present disclosure. The UE Resource Manager 1105 may be an example of aspects of a UE Resource Manager 915, a UE Resource Manager 1015, or a UE Resource Manager 1210 described herein. The UE Resource Manager 1105 may include a SPS manager 1110, a resource grid receiver 1115, an uplink resource component 1120, an uplink message transmitter 1125, a resource identifier 1130, a scaling manager 1135, a dynamic resource component 1140, and a retransmission component 1145. Each of these modules may communicate, directly or indirectly, with one another (e.g., via one or more buses).

The SPS manager 1110 may identify a set of semi-persistent scheduled resources configured for uplink transmissions by the UE. The resource grid receiver 1115 may receive, from a base station, a resource grid that indicates scheduled uplink communications for one or more other UEs. In some examples, the resource grid receiver 1115 may receive a broadcast message from the base station, the broadcast message indicating the resource grid. In some examples, the resource grid receiver 1115 may receive a group-specific control channel for a set of UEs including the UE, the group-specific control channel indicating the resource grid. In some cases, the group-specific control channel includes a PDCCH.

The uplink resource component 1120 may determine a set of uplink resources for the UE based on the set of semi-persistent scheduled resources and the resource grid. In some examples, the uplink resource component 1120 may determine the set of uplink resources based on the resources for the scheduled uplink communications, the set of uplink resources including time-frequency resources non overlapping with the set of semi-persistent scheduled resources and the resources for the scheduled uplink communications.

In some examples, determining a set of conditional resources available for the UE based on the resources for the scheduled uplink communications, where the set of uplink resources includes at least a portion of the set of conditional resources. In some cases, the set of uplink resources includes additional resources different from the set of semi-persistent scheduled resources.

The uplink message transmitter 1125 may transmit an uplink message to the base station via the set of uplink resources. The resource identifier 1130 may identify resources for the scheduled uplink communications based on the resource grid. In some examples, the resource identifier 1130 may identify resources for the scheduled uplink communications based on the resource grid.

The scaling manager 1135 may match and scaling the uplink message across the set of uplink resources, the set of uplink resources including the set of semi-persistent scheduled resources. The dynamic resource component 1140 may identify a set of dynamically configured retransmission resources for the UE after transmission of the uplink message. In some cases, the set of dynamically configured retransmission resources is associated with a power boost.

The retransmission component 1145 may retransmit the uplink message via the set of dynamically configured retransmission resources for the UE. In some cases, the uplink message is retransmitted in accordance with the power boost.

Figure 12:
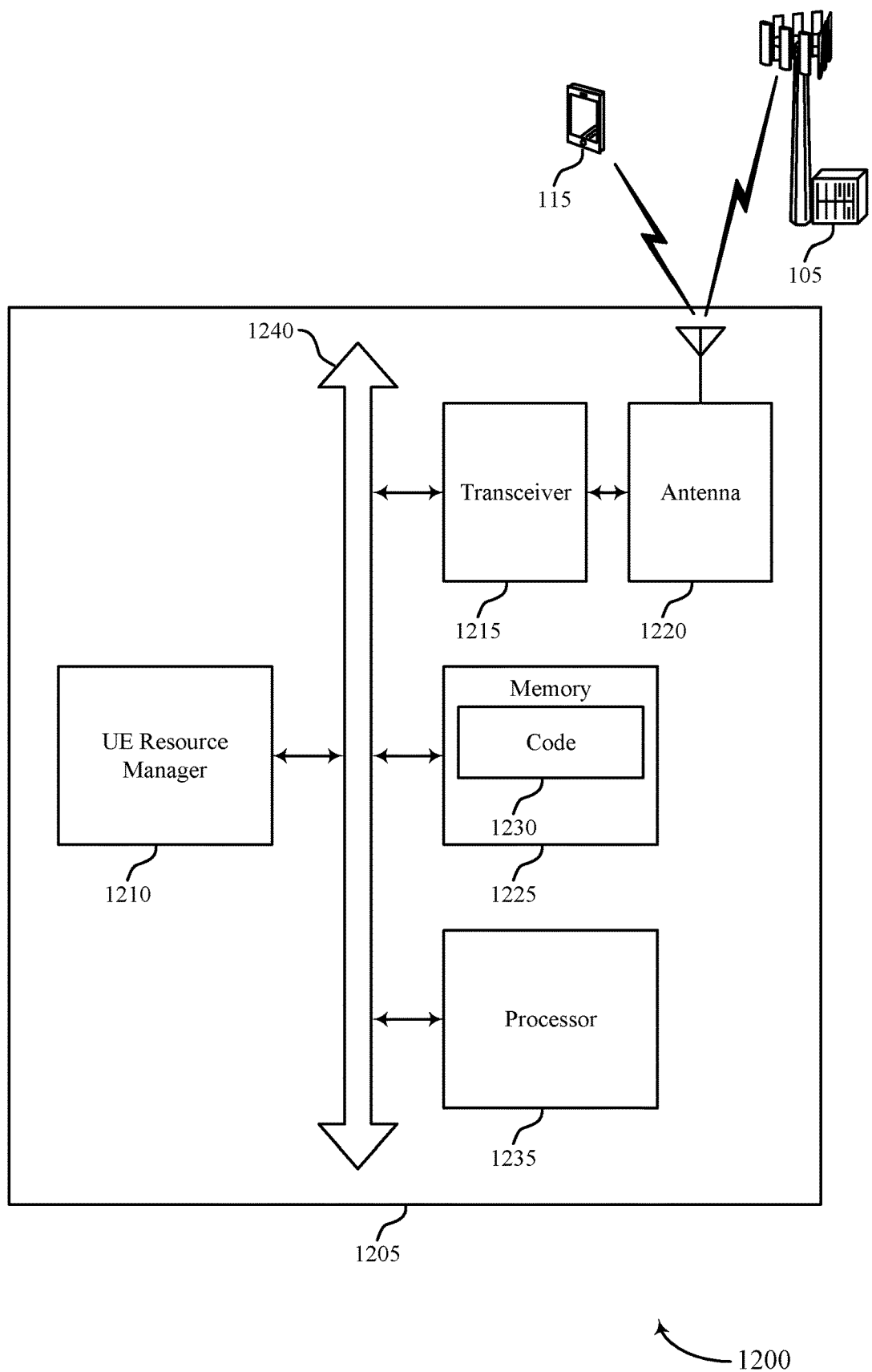
FIG. 12 shows a diagram of a system including a device that supports resource scheduling techniques in wireless systems in accordance with aspects of the present disclosure.

FIG. 12 shows a diagram of a system 1200 including a device 1205 that supports resource scheduling techniques in wireless systems in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE resource manager 1210, a transceiver 1215, an antenna 1220, memory 1225, and a processor 1235. These components may be in electronic communication via one or more buses (e.g., bus 1240).

The UE Resource Manager 1210 may identify a set of semi-persistent scheduled resources configured for uplink transmissions by the UE, receive, from a base station, a resource grid that indicates scheduled uplink communications for one or more other UEs, determine a set of uplink resources for the UE based on the set of semi-persistent scheduled resources and the resource grid, and transmit an uplink message to the base station via the set of uplink resources.

The transceiver 1215 may communicate bi-directionally, via one or more antennas, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to the antennas for transmission, and to demodulate packets received from the antennas.

In some cases, the wireless device may include a single antenna 1220. However, in some cases the device may have more than one antenna 1220, which may be capable of concurrently transmitting or receiving multiple wireless transmissions.

The memory 1225 may include random-access memory (RAM) and read-only memory (ROM). The memory 1225 may store computer-readable, computer-executable code 1230 including instructions that, when executed, cause the processor to perform various functions described herein. In some cases, the memory 1225 may contain, among other things, a basic I/O system (BIOS) which may control basic hardware or software operation such as the interaction with peripheral components or devices.

The code 1230 may include instructions to implement aspects of the present disclosure, including instructions to support wireless communications. The code 1230 may be stored in a non-transitory computer-readable medium such as system memory or other type of memory. In some cases, the code 1230 may not be directly executable by the processor 1235 but may cause a computer (e.g., when compiled and executed) to perform functions described herein.

The processor 1235 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1235 may be configured to operate a memory array using a memory controller. In other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting resource scheduling techniques in wireless systems).

Figure 13:
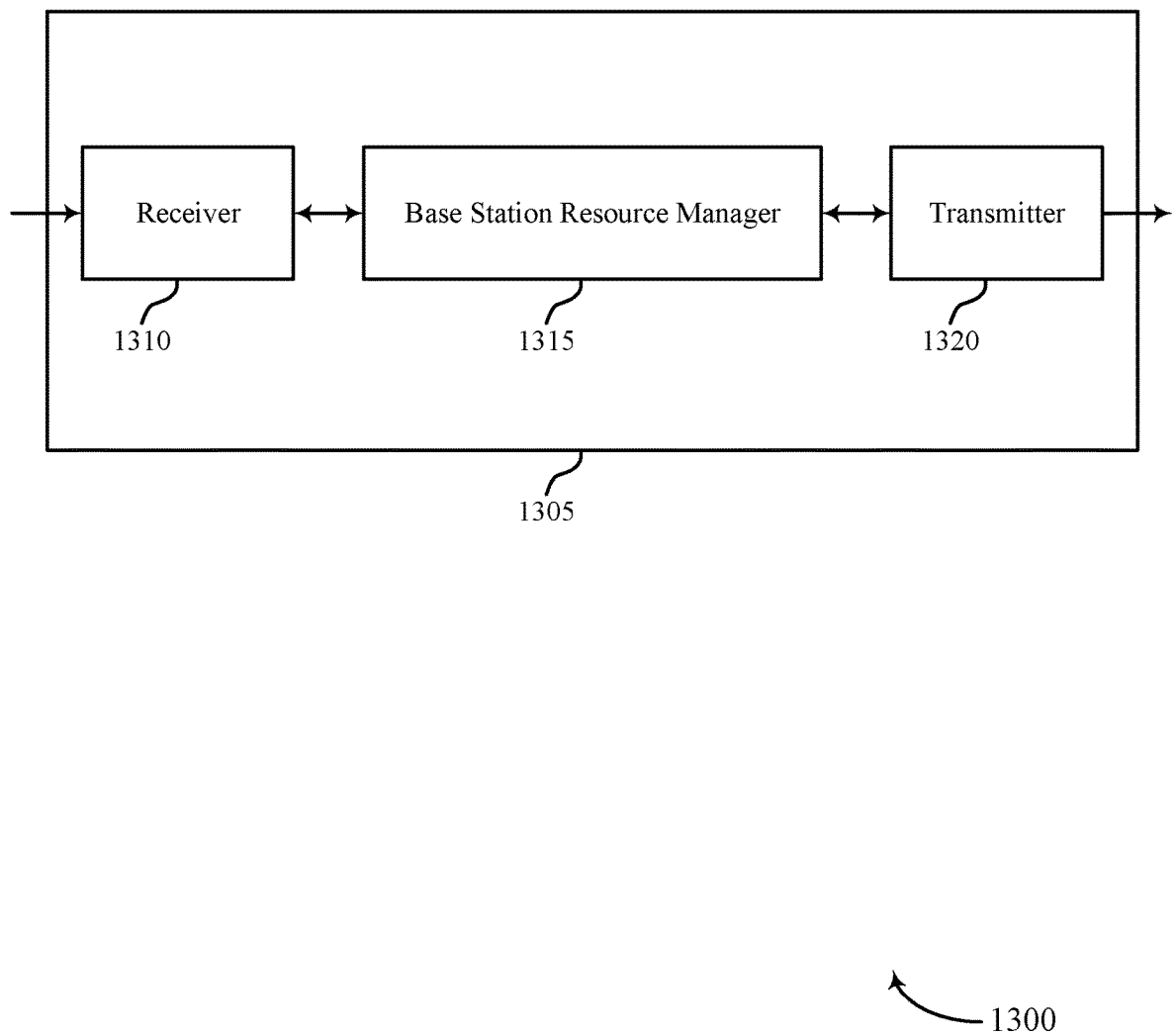
FIGS. 13 and 14 show block diagrams of devices that support resource scheduling techniques in wireless systems in accordance with aspects of the present disclosure.

FIG. 13 shows a block diagram 1300 of a device 1305 that supports resource scheduling techniques in wireless systems in accordance with aspects of the present disclosure. The device 1305 may be an example of aspects of a base station 105 as described herein. The device 1305 may include a receiver 1310, a base station resource manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to resource scheduling techniques in wireless systems, etc.). Information may be passed on to other components of the device 1305. The receiver 1310 may be an example of aspects of the transceiver 1620 described with reference to FIG. 16. The receiver 1310 may utilize a single antenna or a set of antennas.

The Base Station Resource Manager 1315 may transmit an indication of a set of semi-persistent scheduled resources for a UE, transmit, to the UE, a resource grid that indicates scheduled uplink communications for one or more other UEs, and monitor a set of uplink resources for an uplink message from the UE based on the resource grid, the set of uplink resources including at least a portion of the set of semi-persistent scheduled resources. The Base Station Resource Manager 1315 may be an example of aspects of the Base Station Resource Manager 1610 described herein.

The Base Station Resource Manager 1315, or its sub-components, may be implemented in hardware, code (e.g., software or firmware) executed by a processor, or any combination thereof. If implemented in code executed by a processor, the functions of the Base Station Resource Manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The Base Station Resource Manager 1315, or its sub-components, may be physically located at various positions, including being distributed such that portions of functions are implemented at different physical locations by one or more physical components. In some examples, the Base Station Resource Manager 1315, or its sub-components, may be a separate and distinct component in accordance with various aspects of the present disclosure. In some examples, the Base Station Resource Manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
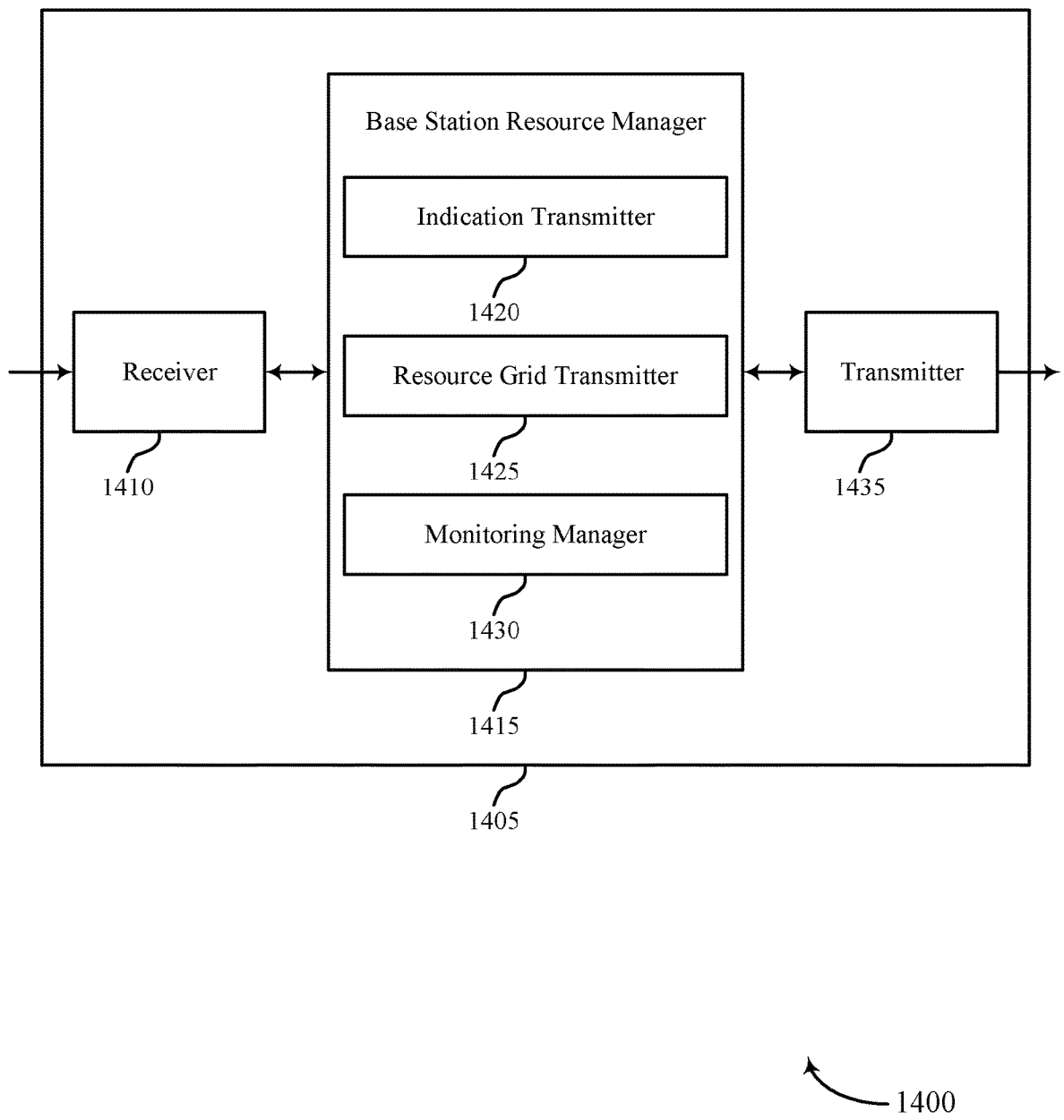

FIG. 14 shows a block diagram 1400 of a device 1405 that supports resource scheduling techniques in wireless systems in accordance with aspects of the present disclosure. The device 1405 may be an example of aspects of a device 1305, or a base station 105 as described herein. The device 1405 may include a receiver 1410, a base station resource manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to resource scheduling techniques in wireless systems, etc.). Information may be passed on to other components of the device 1405. The receiver 1410 may be an example of aspects of the transceiver 1620 described with reference to FIG. 16. The receiver 1410 may utilize a single antenna or a set of antennas.

The Base Station Resource Manager 1415 may be an example of aspects of the Base Station Resource Manager 1315 as described herein. The Base Station Resource Manager 1415 may include an indication transmitter 1420, a resource grid transmitter 1425, and a monitoring manager 1430. The Base Station Resource Manager 1415 may be an example of aspects of the Base Station Resource Manager 1610 described herein.

The indication transmitter 1420 may transmit an indication of a set of semi-persistent scheduled resources for a UE. The resource grid transmitter 1425 may transmit, to the UE, a resource grid that indicates scheduled uplink communications for one or more other UEs. The monitoring manager 1430 may monitor a set of uplink resources for an uplink message from the UE based on the resource grid, the set of uplink resources including at least a portion of the set of semi-persistent scheduled resources.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
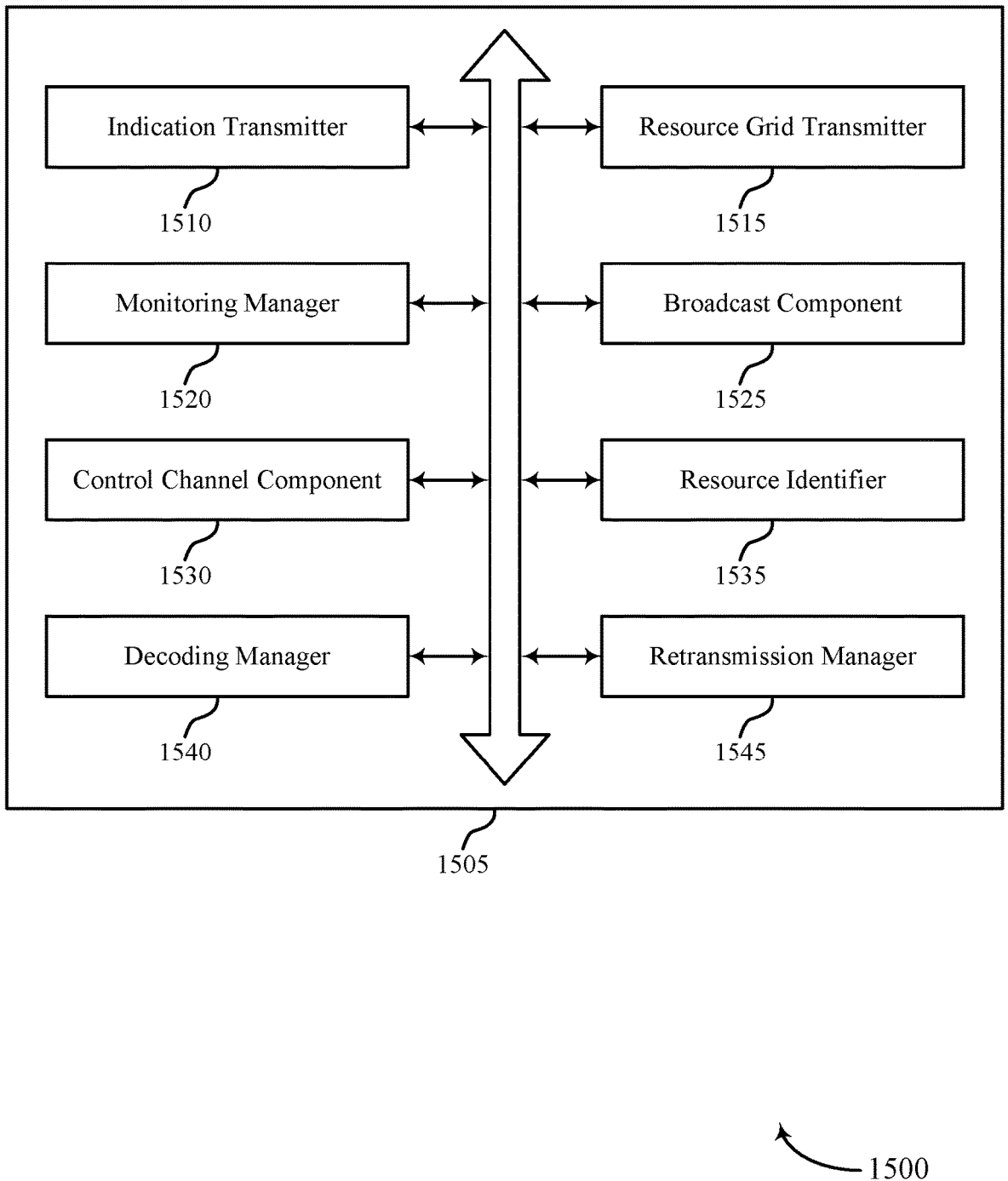
FIG. 15 shows a block diagram of a Base Station Resource Manager that supports resource scheduling techniques in wireless systems in accordance with aspects of the present disclosure.

FIG. 15 shows a block diagram 1500 of a Base Station Resource Manager 1505 that supports resource scheduling techniques in wireless systems in accordance with aspects of the present disclosure. The Base Station Resource Manager 1505 may be an example of aspects of a Base Station Resource Manager 1315, a Base Station Resource Manager 1415, or a Base Station Resource Manager 1610 described herein. The Base Station Resource Manager 1505 may include an indication transmitter 1510, a resource grid transmitter 1515, a monitoring manager 1520, a broadcast component 1525, a control channel component 1530, a resource identifier 1535, a decoding manager 1540, and a retransmission manager 1545. Each of these modules may communicate, directly or indirectly, with one another (e.g., via one or more buses).

The indication transmitter 1510 may transmit an indication of a set of semi-persistent scheduled resources for a UE. In some examples, the indication transmitter 1510 may transmit an indication of the set of dynamically configured retransmission resources to the UE. The resource grid transmitter 1515 may transmit, to the UE, a resource grid that indicates scheduled uplink communications for one or more other UEs.

The monitoring manager 1520 may monitor a set of uplink resources for an uplink message from the UE based on the resource grid, the set of uplink resources including at least a portion of the set of semi-persistent scheduled resources. In some examples, the monitoring manager 1520 may monitor the set of uplink resources including time-frequency resources non overlapping with the set of semi-persistent scheduled resources and the resources for the scheduled uplink communications. In some examples, the monitoring manager 1520 may monitor the set of dynamically configured retransmission resources for a retransmission of the uplink message from the UE.

The broadcast component 1525 may transmit a broadcast message that indicates the resource grid. The control channel component 1530 may transmit a group-specific control channel for a set of UEs including the UE, the group-specific control channel indicating the resource grid. In some cases, the group-specific control channel includes a PDCCH.

The resource identifier 1535 may identify resources for the scheduled uplink communications based on the resource grid. The decoding manager 1540 may determine a decoding failure of the uplink message based on the monitoring. The retransmission manager 1545 may dynamically configure a set of retransmission resources for the UE based on the decoding failure.

Figure 16:
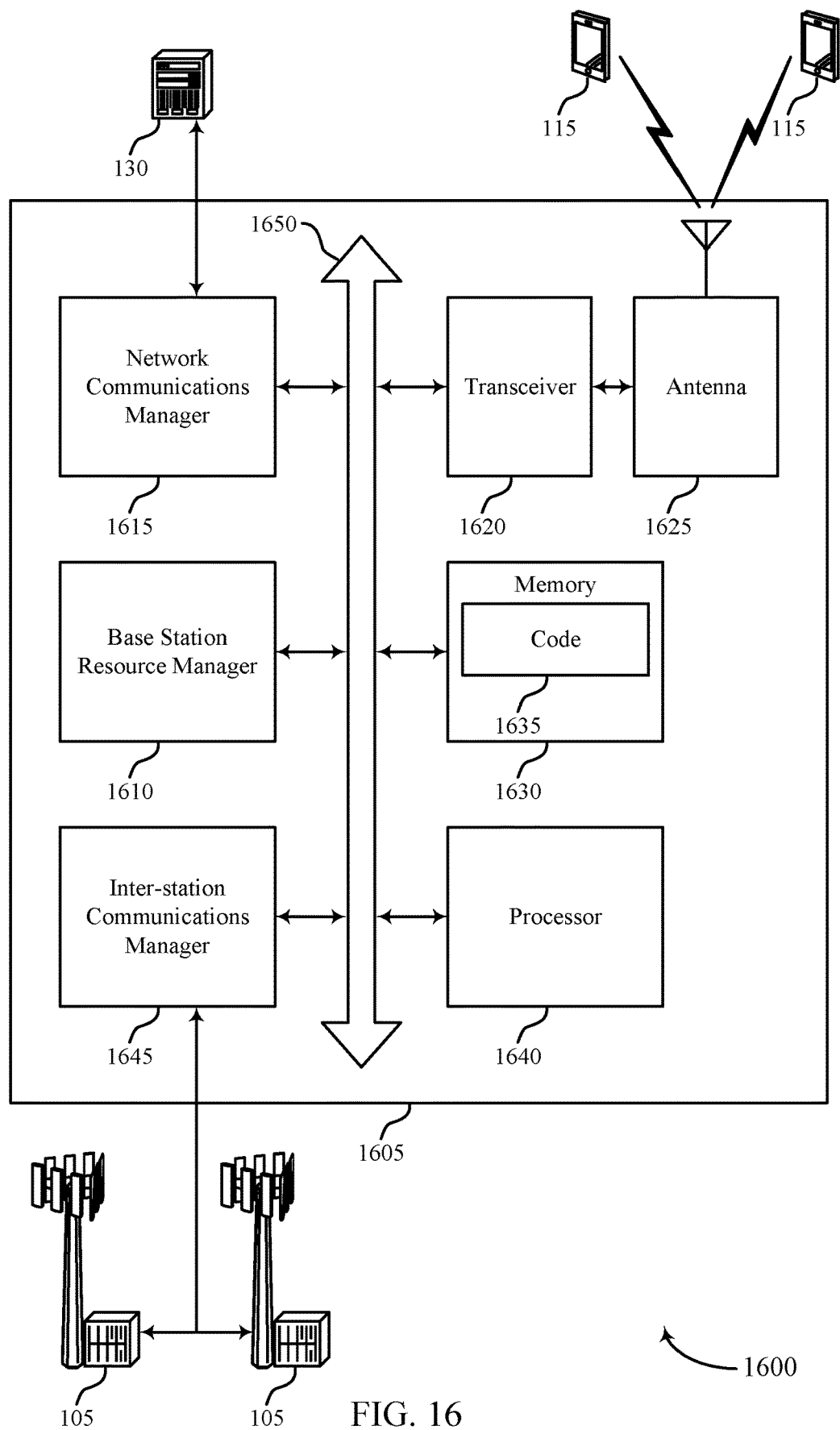
FIG. 16 shows a diagram of a system including a device that supports resource scheduling techniques in wireless systems in accordance with aspects of the present disclosure.

FIG. 16 shows a diagram of a system 1600 including a device 1605 that supports resource scheduling techniques in wireless systems in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station resource manager 1610, a network communications manager 1615, a transceiver 1620, an antenna 1625, memory 1630, a processor 1640, and an inter-station communications manager 1645. These components may be in electronic communication via one or more buses (e.g., bus 1650).

The Base Station Resource Manager 1610 may transmit an indication of a set of semi-persistent scheduled resources for a UE, transmit, to the UE, a resource grid that indicates scheduled uplink communications for one or more other UEs, and monitor a set of uplink resources for an uplink message from the UE based on the resource grid, the set of uplink resources including at least a portion of the set of semi-persistent scheduled resources.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 16{#Software} including instructions that, when executed, cause the processor to perform various functions described herein. In some cases, the memory 1630 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting resource scheduling techniques in wireless systems).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

Figure 17:
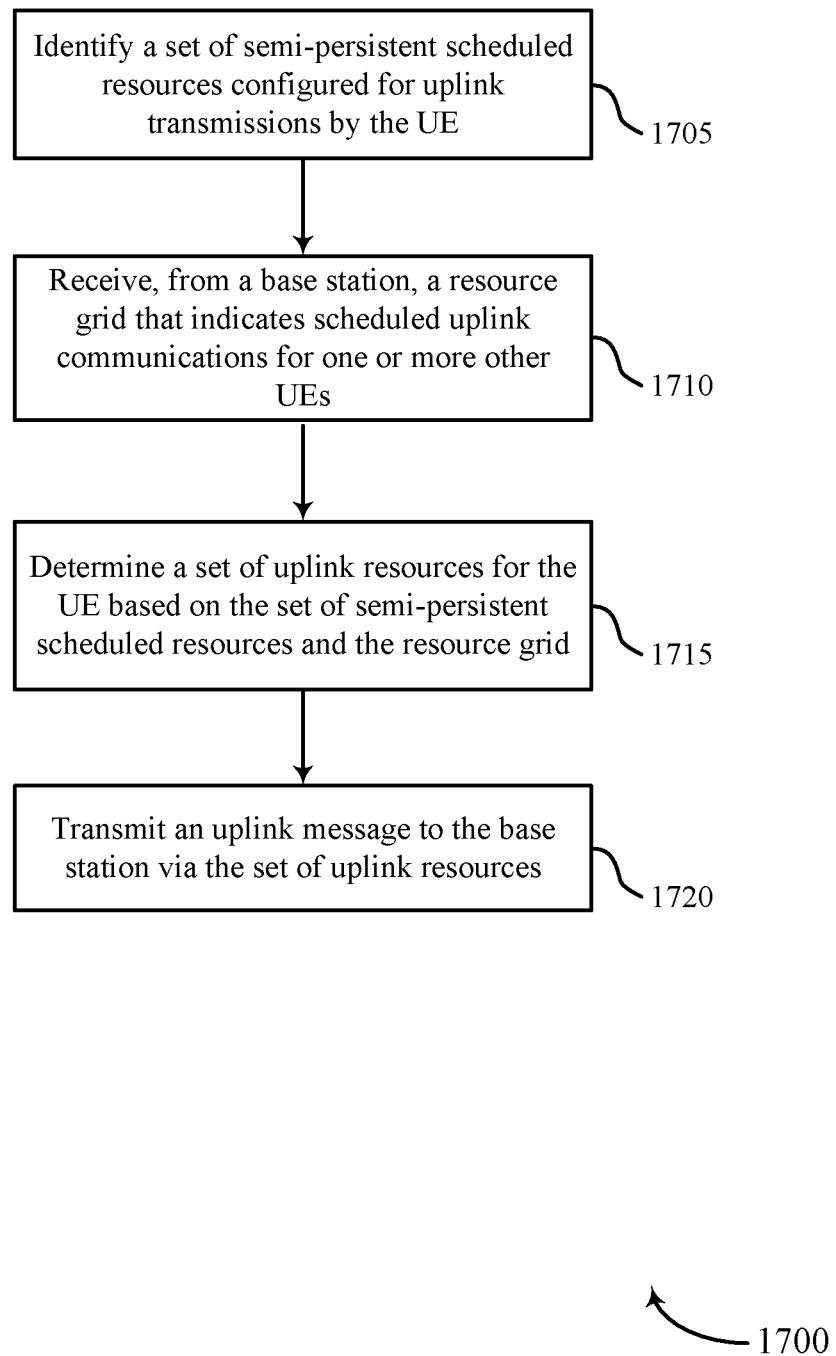
FIGS. 17 through 20 show flowcharts illustrating methods that support resource scheduling techniques in wireless systems in accordance with aspects of the present disclosure.

FIG. 17 shows a flowchart illustrating a method 1700 that supports resource scheduling techniques in wireless systems in accordance with aspects of the present disclosure. The operations of method 1700 may be implemented by a UE 115 or its components as described herein. For example, the operations of method 1700 may be performed by a UE Resource Manager as described with reference to FIGS. 9 through 12. In some examples, a UE may execute a set of instructions to control the functional elements of the UE to perform the described functions. Additionally or alternatively, a UE may perform aspects of the described functions using special-purpose hardware.

At 1705, the UE may identify a set of semi-persistent scheduled resources configured for uplink transmissions by the UE. The operations of 1705 may be performed according to the methods described herein. In some examples, aspects of the operations of 1705 may be performed by a SPS manager as described with reference to FIGS. 9 through 12.

At 1710, the UE may receive, from a base station, a resource grid that indicates scheduled uplink communications for one or more other UEs. The operations of 1710 may be performed according to the methods described herein. In some examples, aspects of the operations of 1710 may be performed by a resource grid receiver as described with reference to FIGS. 9 through 12.

At 1715, the UE may determine a set of uplink resources for the UE based on the set of semi-persistent scheduled resources and the resource grid. The operations of 1715 may be performed according to the methods described herein. In some examples, aspects of the operations of 1715 may be performed by an uplink resource component as described with reference to FIGS. 9 through 12.

At 1720, the UE may transmit an uplink message to the base station via the set of uplink resources. The operations of 1720 may be performed according to the methods described herein. In some examples, aspects of the operations of 1720 may be performed by an uplink message transmitter as described with reference to FIGS. 9 through 12.

Figure 18:
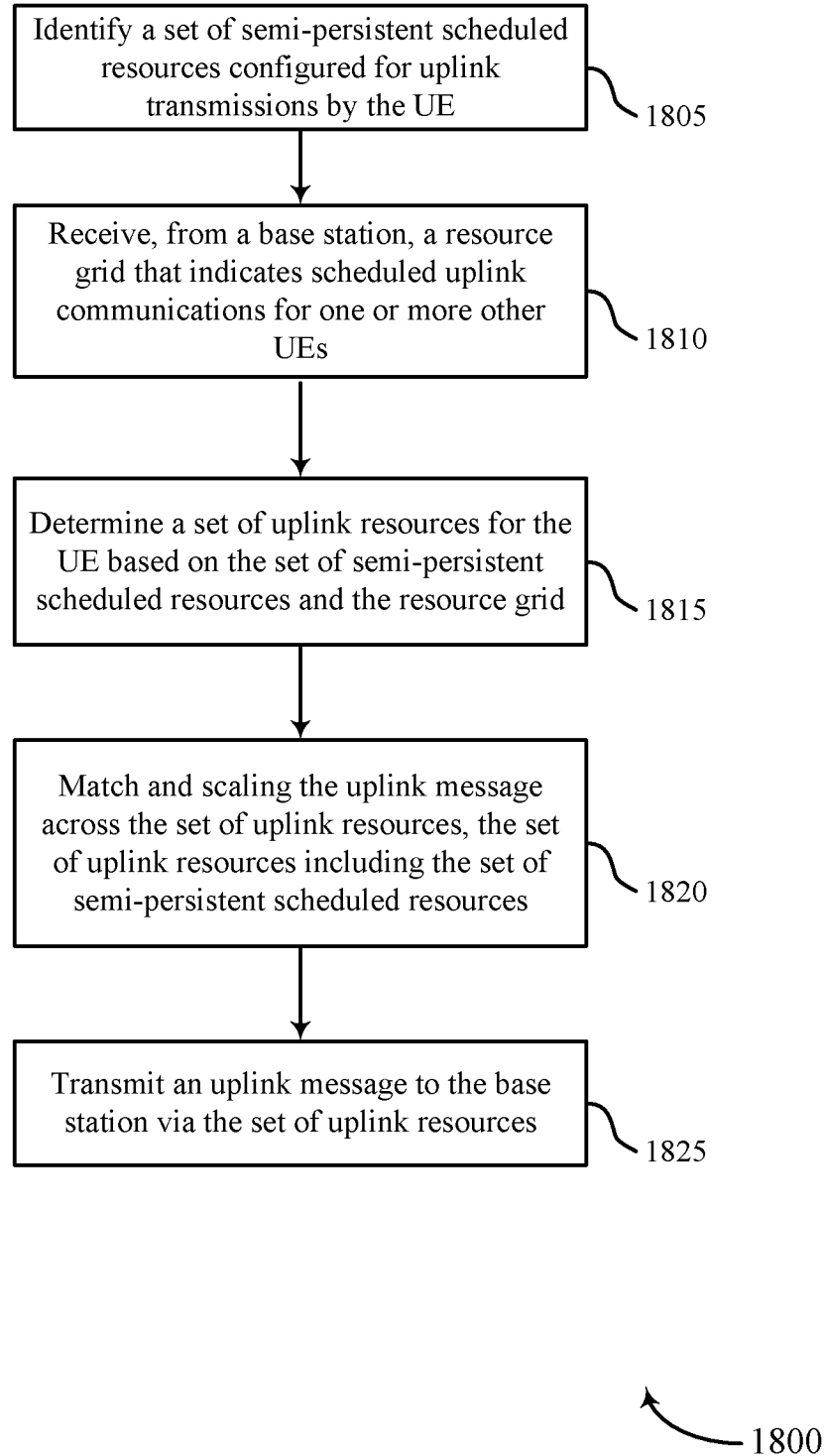

FIG. 18 shows a flowchart illustrating a method 1800 that supports resource scheduling techniques in wireless systems in accordance with aspects of the present disclosure. The operations of method 1800 may be implemented by a UE 115 or its components as described herein. For example, the operations of method 1800 may be performed by a UE Resource Manager as described with reference to FIGS. 9 through 12. In some examples, a UE may execute a set of instructions to control the functional elements of the UE to perform the described functions. Additionally or alternatively, a UE may perform aspects of the described functions using special-purpose hardware.

At 1805, the UE may identify a set of semi-persistent scheduled resources configured for uplink transmissions by the UE. The operations of 1805 may be performed according to the methods described herein. In some examples, aspects of the operations of 1805 may be performed by a SPS manager as described with reference to FIGS. 9 through 12.

At 1810, the UE may receive, from a base station, a resource grid that indicates scheduled uplink communications for one or more other UEs. The operations of 1810 may be performed according to the methods described herein. In some examples, aspects of the operations of 1810 may be performed by a resource grid receiver as described with reference to FIGS. 9 through 12.

At 1815, the UE may determine a set of uplink resources for the UE based on the set of semi-persistent scheduled resources and the resource grid. The operations of 1815 may be performed according to the methods described herein. In some examples, aspects of the operations of 1815 may be performed by an uplink resource component as described with reference to FIGS. 9 through 12.

At 1820, the UE may match and scaling the uplink message across the set of uplink resources, the set of uplink resources including the set of semi-persistent scheduled resources. The operations of 1820 may be performed according to the methods described herein. In some examples, aspects of the operations of 1820 may be performed by a scaling manager as described with reference to FIGS. 9 through 12.

At 1825, the UE may transmit an uplink message to the base station via the set of uplink resources. The operations of 1825 may be performed according to the methods described herein. In some examples, aspects of the operations of 1825 may be performed by an uplink message transmitter as described with reference to FIGS. 9 through 12.

Figure 19:
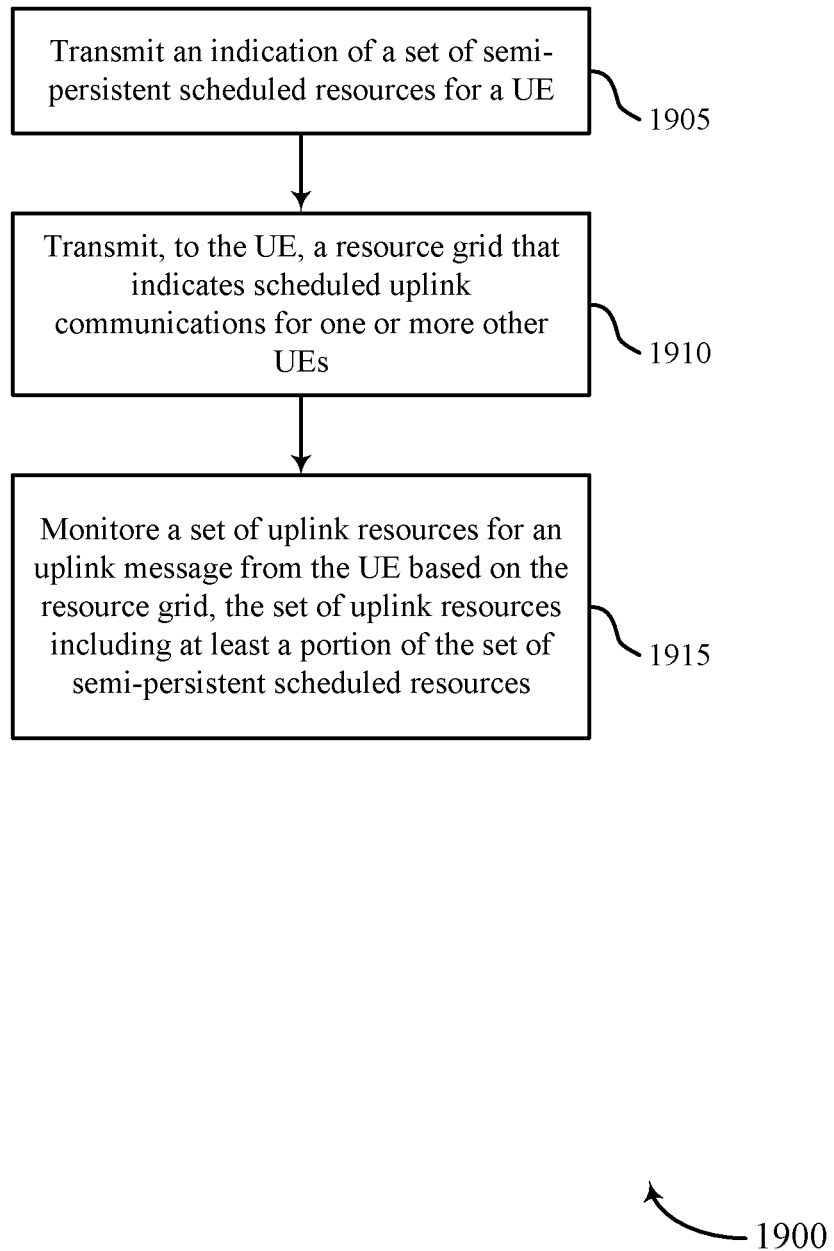

FIG. 19 shows a flowchart illustrating a method 1900 that supports resource scheduling techniques in wireless systems in accordance with aspects of the present disclosure. The operations of method 1900 may be implemented by a base station 105 or its components as described herein. For example, the operations of method 1900 may be performed by a Base Station Resource Manager as described with reference to FIGS. 13 through 16. In some examples, a base station may execute a set of instructions to control the functional elements of the base station to perform the described functions. Additionally or alternatively, a base station may perform aspects of the described functions using special-purpose hardware.

At 1905, the base station may transmit an indication of a set of semi-persistent scheduled resources for a UE. The operations of 1905 may be performed according to the methods described herein. In some examples, aspects of the operations of 1905 may be performed by an indication transmitter as described with reference to FIGS. 13 through 16.

At 1910, the base station may transmit, to the UE, a resource grid that indicates scheduled uplink communications for one or more other UEs. The operations of 1910 may be performed according to the methods described herein. In some examples, aspects of the operations of 1910 may be performed by a resource grid transmitter as described with reference to FIGS. 13 through 16.

At 1915, the base station may monitor a set of uplink resources for an uplink message from the UE based on the resource grid, the set of uplink resources including at least a portion of the set of semi-persistent scheduled resources. The operations of 1915 may be performed according to the methods described herein. In some examples, aspects of the operations of 1915 may be performed by a monitoring manager as described with reference to FIGS. 13 through 16.

Figure 20:
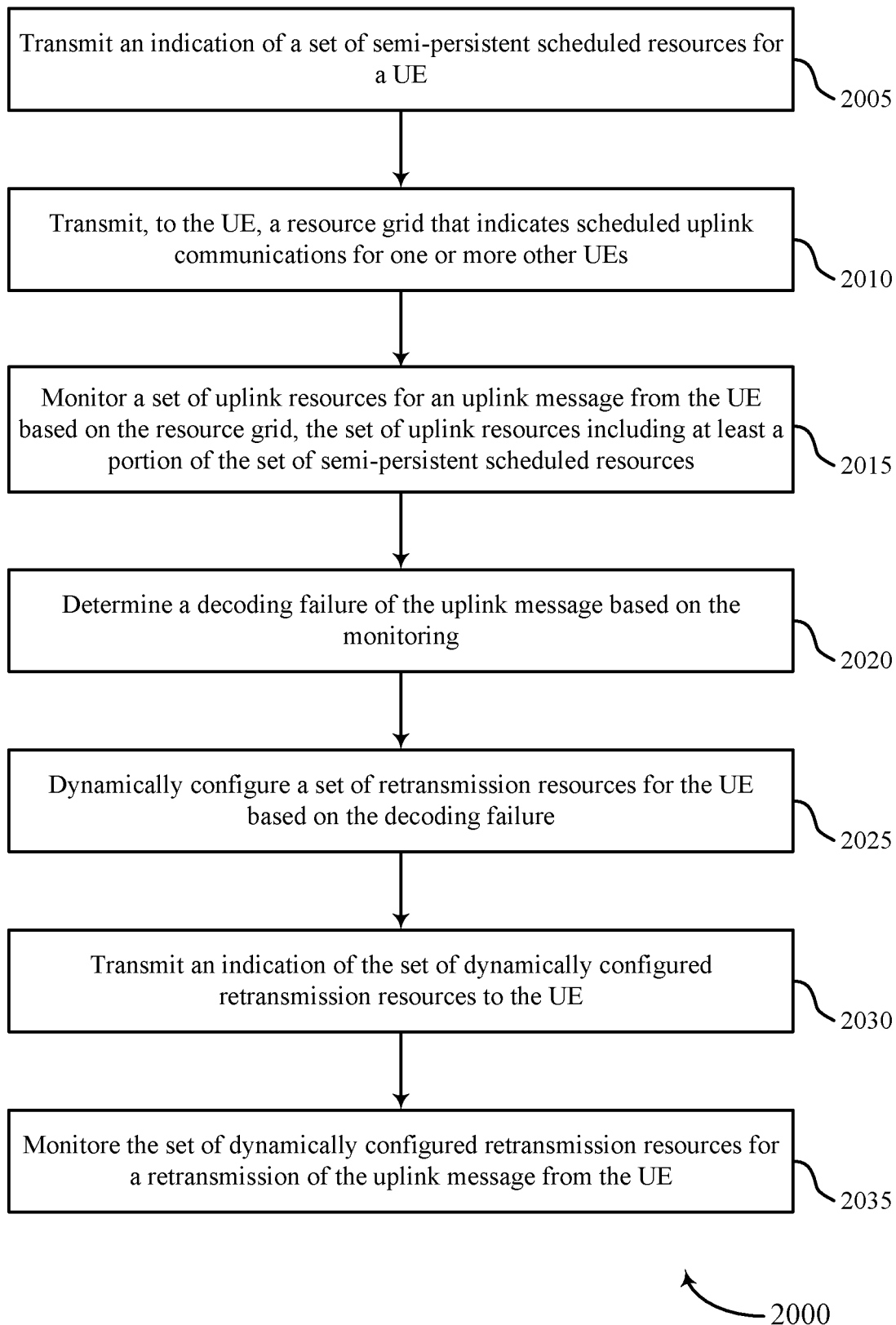

FIG. 20 shows a flowchart illustrating a method 2000 that supports resource scheduling techniques in wireless systems in accordance with aspects of the present disclosure. The operations of method 2000 may be implemented by a base station 105 or its components as described herein. For example, the operations of method 2000 may be performed by a Base Station Resource Manager as described with reference to FIGS. 13 through 16. In some examples, a base station may execute a set of instructions to control the functional elements of the base station to perform the described functions. Additionally or alternatively, a base station may perform aspects of the described functions using special-purpose hardware.

At 2005, the base station may transmit an indication of a set of semi-persistent scheduled resources for a UE. The operations of 2005 may be performed according to the methods described herein. In some examples, aspects of the operations of 2005 may be performed by an indication transmitter as described with reference to FIGS. 13 through 16.

At 2010, the base station may transmit, to the UE, a resource grid that indicates scheduled uplink communications for one or more other UEs. The operations of 2010 may be performed according to the methods described herein. In some examples, aspects of the operations of 2010 may be performed by a resource grid transmitter as described with reference to FIGS. 13 through 16.

At 2015, the base station may monitor a set of uplink resources for an uplink message from the UE based on the resource grid, the set of uplink resources including at least a portion of the set of semi-persistent scheduled resources. The operations of 2015 may be performed according to the methods described herein. In some examples, aspects of the operations of 2015 may be performed by a monitoring manager as described with reference to FIGS. 13 through 16.

At 2020, the base station may determine a decoding failure of the uplink message based on the monitoring. The operations of 2020 may be performed according to the methods described herein. In some examples, aspects of the operations of 2020 may be performed by a decoding manager as described with reference to FIGS. 13 through 16.

At 2025, the base station may dynamically configure a set of retransmission resources for the UE based on the decoding failure. The operations of 2025 may be performed according to the methods described herein. In some examples, aspects of the operations of 2025 may be performed by a retransmission manager as described with reference to FIGS. 13 through 16.

At 2030, the base station may transmit an indication of the set of dynamically configured retransmission resources to the UE. The operations of 2030 may be performed according to the methods described herein. In some examples, aspects of the operations of 2030 may be performed by an indication transmitter as described with reference to FIGS. 13 through 16.

At 2035, the base station may monitor the set of dynamically configured retransmission resources for a retransmission of the uplink message from the UE. The operations of 2035 may be performed according to the methods described herein. In some examples, aspects of the operations of 2035 may be performed by a monitoring manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

EXAMPLE 1

A method for wireless communications at a UE, comprising: identifying a set of semi-persistent scheduled resources configured for uplink transmissions by the UE; receiving, from a base station, a resource grid that indicates scheduled uplink communications for one or more other UEs; determining a set of uplink resources for the UE based at least in part on the set of semi-persistent scheduled resources and the resource grid; and transmitting an uplink message to the base station via the set of uplink resources.

EXAMPLE 2

The method of example 1, further comprising: identifying resources for the scheduled uplink communications based at least in part on the resource grid; and determining the set of uplink resources based at least in part on the resources for the scheduled uplink communications, the set of uplink resources comprising time-frequency resources non overlapping with the set of semi-persistent scheduled resources and the resources for the scheduled uplink communications.

EXAMPLE 3

The method of any of examples 1 or 2, further comprising: identifying resources for the scheduled uplink communications based at least in part on the resource grid; and determining a set of conditional resources available for the UE based at least in part on the resources for the scheduled uplink communications, wherein the set of uplink resources comprises at least a portion of the set of conditional resources.

EXAMPLE 4

The method of any of examples 1 to 3, wherein transmitting the uplink message comprises: rate-matching and scaling the uplink message across the set of uplink resources, the set of uplink resources comprising the set of semi-persistent scheduled resources.

EXAMPLE 5

The method of any of examples 1 to 4, wherein the set of uplink resources comprises additional resources different from the set of semi-persistent scheduled resources.

EXAMPLE 6

The method of any of examples 1 to 5, wherein receiving the resource grid comprises: receiving a broadcast message from the base station, the broadcast message indicating the resource grid.

EXAMPLE 7

The method of any of examples 1 to 6, wherein receiving the resource grid comprises: receiving a group-specific control channel for a set of UEs including the UE, the group-specific control channel indicating the resource grid.

EXAMPLE 8

The method of any of examples 1 to 7, wherein the group-specific control channel comprises a PDCCH.

EXAMPLE 9

The method of any of examples 1 to 8, identifying a set of dynamically configured retransmission resources for the UE after transmission of the uplink message; and retransmitting the uplink message via the set of dynamically configured retransmission resources for the UE.

EXAMPLE 10

The method of any of examples 1 to 9, wherein the set of dynamically configured retransmission resources is associated with a power boost; and the uplink message is retransmitted in accordance with the power boost.

EXAMPLE 11

The method of any of examples 1 to 10, wherein the scheduled uplink communications for the one or more other UEs are retransmissions for the one or more other UEs scheduled via resources indicated by the resource grid.

EXAMPLE 16

An apparatus for wireless communications comprising a processor; memory in electronic communication with the processor; and instructions stored in the memory and executable by the processor to cause the apparatus to perform a method of any of examples 1 to 9.

EXAMPLE 17

A non-transitory computer-readable medium storing code for wireless communications, the code comprising instructions executable by a processor to perform a method of any of examples 1 to 9.

EXAMPLE 18

An apparatus, comprising means for performing the method of any of examples 1 to 9.

EXAMPLE 12

A method for wireless communications at a base station, comprising: transmitting an indication of a set of semi-persistent scheduled resources for a U); transmitting, to the UE, a resource grid that indicates scheduled uplink communications for one or more other UEs; and monitoring a set of uplink resources for an uplink message from the UE based at least in part on the resource grid, the set of uplink resources comprising at least a portion of the set of semi-persistent scheduled resources.

EXAMPLE 13

The method of example 12, further comprising: transmitting a broadcast message that indicates the resource grid.

EXAMPLE 14

The method of any of examples 12 or 13, further comprising: transmitting a group-specific control channel for a set of UEs including the UE, the group-specific control channel indicating the resource grid.

EXAMPLE 15

The method of any of examples 12 to 14, wherein the group-specific control channel comprises a PDCCH.

EXAMPLE 16

The method of any of examples 12 to 15, further comprising: identifying resources for the scheduled uplink communications based at least in part on the resource grid; and monitoring the set of uplink resources including time-frequency resources non overlapping with the set of semi-persistent scheduled resources and the resources for the scheduled uplink communications.

EXAMPLE 17

The method of any of examples 12 to 16, wherein the scheduled uplink communications for the one or more other UEs are retransmissions for the one or more other UEs scheduled via resources indicated by the resource grid.

EXAMPLE 18

The method of any of examples 12 to 17, further comprising: determining a decoding failure of the uplink message based at least in part on the monitoring; dynamically configuring a set of retransmission resources for the UE based at least in part on the decoding failure; transmitting an indication of the set of dynamically configured retransmission resources to the UE; and monitoring the set of dynamically configured retransmission resources for a retransmission of the uplink message from the UE.

EXAMPLE 19

The method of any of examples 12 to 18, wherein the set of dynamically configured retransmission resources is associated with a power boost.

EXAMPLE 16

An apparatus for wireless communications comprising a processor; memory in electronic communication with the processor; and instructions stored in the memory and executable by the processor to cause the apparatus to perform a method of any of examples 12 to 19.

EXAMPLE 17

A non-transitory computer-readable medium storing code for wireless communications, the code comprising instructions executable by a processor to perform a method of any of examples 12 to 19.

EXAMPLE 18

An apparatus, comprising means for performing the method of any of examples 12 to 19.

Techniques described herein may be used for various wireless communications systems such as code division multiple access (CDMA), time division multiple access (TDMA), frequency division multiple access (FDMA), orthogonal FDMA (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a set of semi-persistent scheduled resources configured for uplink transmissions by the UE;
   receiving, from a network device, a resource grid that indicates scheduled uplink communications for one or more other UEs;
   determining a set of uplink resources for an initial uplink message from the UE based at least in part on the set of semi-persistent scheduled resources and the scheduled uplink communications for the one or more other UEs, wherein the initial uplink message is a first message transmitted after receipt of the resource grid; and
   transmitting the initial uplink message to the network device via the set of uplink resources.

2. The method of claim 1, further comprising:
   identifying resources for the scheduled uplink communications based at least in part on the resource grid; and
   determining the set of uplink resources based at least in part on the resources for the scheduled uplink communications, the set of uplink resources comprising time-frequency resources non overlapping with the set of semi-persistent scheduled resources and the resources for the scheduled uplink communications.

3. The method of claim 1, further comprising:
   identifying resources for the scheduled uplink communications based at least in part on the resource grid; and
   determining a set of conditional resources available for the UE based at least in part on the resources for the scheduled uplink communications, wherein the set of uplink resources comprises at least a portion of the set of conditional resources.

4. The method of claim 1, wherein transmitting the initial uplink message comprises:
   rate-matching and scaling the initial uplink message across the set of uplink resources, the set of uplink resources comprising the set of semi-persistent scheduled resources.

5. The method of claim 4, wherein the set of uplink resources comprises additional resources different from the set of semi-persistent scheduled resources.

6. The method of claim 1, wherein receiving the resource grid comprises:
   receiving a broadcast message from the network device, the broadcast message indicating the resource grid.

7. The method of claim 1, wherein receiving the resource grid comprises:
   receiving a group-specific control channel for a set of UEs including the UE, the group-specific control channel indicating the resource grid.

8. The method of claim 7, wherein the group-specific control channel comprises a physical downlink control channel (PDCCH).

9. The method of claim 1, further comprising:
   identifying a set of dynamically configured retransmission resources for the UE after transmission of the initial uplink message; and
   retransmitting the initial uplink message via the set of dynamically configured retransmission resources for the UE.

10. The method of claim 9, wherein:
    the set of dynamically configured retransmission resources is associated with a power boost; and
    the initial uplink message is retransmitted in accordance with the power boost.

11. The method of claim 1, wherein the scheduled uplink communications for the one or more other UEs are retransmissions for the one or more other UEs scheduled via resources indicated by the resource grid.

12. A method for wireless communications at a network device, comprising:
    transmitting an indication of a set of semi-persistent scheduled resources for a user equipment (UE);
    transmitting a resource grid that indicates scheduled uplink communications for one or more other UEs; and
    monitoring a set of uplink resources for an initial uplink message from the UE based at least in part on the scheduled uplink communications for the one or more other UEs, wherein the initial uplink message is a first message received after transmitting the resource grid, and wherein the set of uplink resources comprises at least a portion of the set of semi-persistent scheduled resources.

13. The method of claim 12, further comprising:
    transmitting a broadcast message that indicates the resource grid.

14. The method of claim 12, further comprising:
    transmitting a group-specific control channel for a set of UEs including the UE, the group-specific control channel indicating the resource grid.

15. The method of claim 14, wherein the group-specific control channel comprises a physical downlink control channel (PDCCH).

16. The method of claim 12, further comprising:
    identifying resources for the scheduled uplink communications based at least in part on the resource grid; and
    monitoring the set of uplink resources including time-frequency resources non overlapping with the set of semi-persistent scheduled resources and the resources for the scheduled uplink communications.

17. The method of claim 12, wherein the scheduled uplink communications for the one or more other UEs are retransmissions for the one or more other UEs scheduled via resources indicated by the resource grid.

18. The method of claim 12, further comprising:
    determining a decoding failure of the initial uplink message based at least in part on the monitoring;
    dynamically configuring a set of retransmission resources for the UE based at least in part on the decoding failure;

transmitting an indication of the set of dynamically configured retransmission resources; and monitoring the set of dynamically configured retransmission resources for a retransmission of the initial uplink message.

19. The method of claim 18, wherein the set of dynamically configured retransmission resources is associated with a power boost.

20. A user equipment (UE) for wireless communications, comprising:

a processor; and a memory coupled with the processor, with instructions stored in the memory, the instructions being executable by the processor to cause the UE to:

identify a set of semi-persistent scheduled resources configured for uplink transmissions by the UE;

receive, from a network device, a resource grid that indicates scheduled uplink communications for one or more other UEs;

determine a set of uplink resources for an initial uplink message from the UE based at least in part on the set of semi-persistent scheduled resources and the scheduled uplink communications for the one or more other UEs, wherein the initial uplink message is a first message transmitted after receipt of the resource grid; and transmit the initial uplink message to the network device via the set of uplink resources.

21. The UE of claim 20, wherein the instructions are further executable by the processor to cause the UE to:

identify resources for the scheduled uplink communications based at least in part on the resource grid; and determine the set of uplink resources based at least in part on the resources for the scheduled uplink communications, the set of uplink resources comprising time-frequency resources non overlapping with the set of semi-persistent scheduled resources and the resources for the scheduled uplink communications.

22. The UE of claim 20, wherein the instructions are further executable by the processor to cause the UE to:

identify resources for the scheduled uplink communications based at least in part on the resource grid; and determine a set of conditional resources available for the UE based at least in part on the resources for the scheduled uplink communications, wherein the set of uplink resources comprises at least a portion of the set of conditional resources.

23. The UE of claim 20, wherein the instructions to transmit the initial uplink message are executable by the processor to cause the UE to:

match and scaling the initial uplink message across the set of uplink resources, the set of uplink resources comprising the set of semi-persistent scheduled resources.

24. The UE of claim 23, wherein the set of uplink resources comprises additional resources different from the set of semi-persistent scheduled resources.

25. The UE of claim 20, wherein the instructions to receive the resource grid are executable by the processor to cause the UE to:

receive a broadcast message from the network device, the broadcast message indicating the resource grid.

26. The UE of claim 20, wherein the instructions to receive the resource grid are executable by the processor to cause the UE to:

receive a group-specific control channel for a set of UEs including the UE, the group-specific control channel indicating the resource grid.

27. The UE of claim 20, wherein the instructions are further executable by the processor to cause the UE to:

identify a set of dynamically configured retransmission resources for the UE after transmission of the initial uplink message; and retransmit the initial uplink message via the set of dynamically configured retransmission resources for the UE.

28. The UE of claim 27, wherein:

the set of dynamically configured retransmission resources is associated with a power boost; and the initial uplink message is retransmitted in accordance with the power boost.

29. The UE of claim 20, wherein the scheduled uplink communications for the one or more other UEs are retransmissions for the one or more other UEs scheduled via resources indicated by the resource grid.

30. A network device for wireless communications, comprising:

a processor; and a memory coupled with the processor, with instructions stored in the memory, the instructions being executable by the processor to cause the network device to:

transmit an indication of a set of semi-persistent scheduled resources for a user equipment (UE);

transmit, to the UE, a resource grid that indicates scheduled uplink communications for one or more other UEs; and monitor a set of uplink resources for an initial uplink message from the UE based at least in part on the scheduled uplink communications for the one or more other UEs, wherein the initial uplink message is a first message received after transmitting the resource grid, and wherein the set of uplink resources comprises at least a portion of the set of semi-persistent scheduled resources.

* * * * *